United States Patent [19]

Ohe et al.

[11] Patent Number: 4,806,942

[45] Date of Patent: Feb. 21, 1989

[54] AUTOMOBILE TV ANTENNA SYSTEM

[75] Inventors: Junzo Ohe, Toyota; Hiroshi Kondo, Okazaki, both of Japan

[73] Assignee: Toyota Jidosha Kabushiki Kaisha, Toyota, Japan

[21] Appl. No.: 872,489

[22] Filed: Jun. 10, 1986

[30] Foreign Application Priority Data

| Jun. 10, 1985 | [JP] | Japan | 60-126574 |
| Jun. 21, 1985 | [JP] | Japan | 60-136689 |
| Jun. 21, 1985 | [JP] | Japan | 60-136690 |
| Jun. 28, 1985 | [JP] | Japan | 60-143091 |
| Jun. 28, 1985 | [JP] | Japan | 60-143092 |

[51] Int. Cl.$^4$ ................................. H01Q 1/32
[52] U.S. Cl. ................................. 343/713
[58] Field of Search ................ 343/711, 712, 713

[56] References Cited

U.S. PATENT DOCUMENTS

| 2,094,168 | 9/1937 | Forbes | 343/713 |
| 2,200,674 | 5/1940 | McDonald, Jr. | 343/712 |
| 2,212,253 | 8/1940 | Stief | 343/712 |
| 2,404,093 | 7/1946 | Roberts | 343/712 |
| 2,481,978 | 9/1949 | Clough | 343/712 |

(List continued on next page.)

FOREIGN PATENT DOCUMENTS

| 0181120 | 10/1985 | European Pat. Off. |
| 0181200 | 11/1985 | European Pat. Off. |
| 0181765 | 11/1985 | European Pat. Off. |
| 0183523 | 11/1985 | European Pat. Off. |
| 0182497 | 5/1986 | European Pat. Off. |
| 0183520 | 6/1986 | European Pat. Off. |
| 0183443 | 6/1986 | European Pat. Off. |
| 889618 | 7/1949 | Fed. Rep. of Germany |
| 1131762 | 8/1958 | Fed. Rep. of Germany |
| 1949828 | 10/1969 | Fed. Rep. of Germany |
| 2425189 | 12/1974 | Fed. Rep. of Germany |
| 2701921 | 7/1978 | Fed. Rep. of Germany |
| 2745475 | 4/1979 | Fed. Rep. of Germany | 343/712 |
| 2821202 | 11/1979 | Fed. Rep. of Germany |
| 2733478 | 4/1980 | Fed. Rep. of Germany |
| 53-22418 | 7/1978 | Japan |
| 0046617 | 4/1980 | Japan | 343/712 |
| 59-44861 | 3/1984 | Japan |
| 59-44132 | 3/1984 | Japan |
| 9195811 | 12/1984 | Japan |
| 60-1008 | 1/1985 | Japan |
| 60-1009 | 1/1985 | Japan |
| 60-1010 | 1/1985 | Japan |
| 60-1011 | 1/1985 | Japan |
| 60-1012 | 1/1985 | Japan |
| 0129464 | 8/1985 | Japan |

OTHER PUBLICATIONS

Japanese Pat. Abstract, vol. 6, No. 37, E-97, Mar. 6, 1982, 56-156031.

Japanese Pat. Abstract, vol. 6, No. 55, E-101 4/10/82, 56-168441.

[57] ABSTRACT

An automobile TV antenna system for receiving TV broadcast waves includes high-frequency pickups which are accommodated in the interior of a vehicle body in a concealed state without any external exposure. A plurality of high-frequency pickup are provided on the vehicle body at positions spaced from each other and the pickup which has the best reception at a given time is automatically selected by a diversity circuit. Each of the high-frequency pickups is provided in proximity of a marginal edge portion of the vehicle body in order to pick up the high-frequency surface currents which are induced by the broadcast waves and flow concentratedly on the marginal edge portions of the vehicle body. The high-frequency pickup includes a loop antenna or an electrostatic electrode which is disposed in proximity to a marginal edge portion of the vehicle body. The position for fixing the pickup is selected from among the vicinity of a retainer on which an edge molding for a window frame is mounted, a window pillar a truck lid and an engine hood.

16 Claims, 24 Drawing Sheets

U.S. PATENT DOCUMENTS

| | | | |
|---|---|---|---|
| 2,520,984 | 9/1950 | Williams et al. | 343/712 |
| 2,520,986 | 9/1950 | Williams et al. | 343/712 |
| 2,520,988 | 9/1950 | Everitt | 343/713 |
| 2,575,471 | 11/1951 | Schweiss et al. | 343/712 |
| 2,740,113 | 3/1956 | Hemphill | 343/787 |
| 2,774,811 | 12/1956 | Shanok et al. | 343/713 |
| 2,859,441 | 11/1958 | Rosenbaum | 343/712 |
| 2,950,479 | 12/1980 | Pan | 343/702 |
| 2,971,191 | 2/1961 | Davis | 343/712 |
| 3,007,164 | 10/1961 | Davis | 343/713 |
| 3,066,293 | 11/1962 | Davis | 343/713 |
| 3,210,766 | 10/1965 | Parker | 343/702 |
| 3,364,487 | 1/1968 | Maheux | 343/702 |
| 3,611,388 | 10/1971 | Okumura | 343/712 |
| 3,717,876 | 2/1973 | Volkers et al. | 343/712 |
| 3,728,732 | 4/1973 | Igarashi | 343/712 |
| 3,742,508 | 6/1973 | Tomaszewski | 343/713 |
| 3,794,997 | 2/1974 | Iwatsuki et al. | 343/712 |
| 3,823,403 | 7/1974 | Walter et al. | 343/708 |
| 3,916,413 | 10/1975 | Davis | 343/712 |
| 3,961,292 | 6/1976 | Davis | 343/713 |
| 3,961,330 | 6/1976 | Davis | 343/713 |
| 3,972,048 | 7/1976 | Davis | 343/713 |
| 4,003,056 | 1/1977 | Davis | 343/704 |
| 4,080,603 | 3/1978 | Moody | 343/712 |
| 4,217,591 | 8/1980 | Czerwinski | 343/713 |
| 4,278,980 | 7/1981 | Ogita et al. | 343/748 |
| 4,317,121 | 2/1982 | Allen, Jr. | 343/712 |
| 4,339,827 | 7/1982 | Torres et al. | 455/188 |
| 4,394,779 | 7/1983 | Hansen | 343/713 |
| 4,499,606 | 2/1985 | Rambo | 455/277 |
| 4,506,267 | 3/1985 | Harmuth | 343/744 |
| 4,566,133 | 1/1986 | Rambo | 455/277 |
| 4,633,519 | 12/1986 | Gotoh et al. | 455/277 |

FOREIGN PATENT DOCUMENTS

Japanese Pat. Abstract, vol. 7, No. E-187, 7/15/83, 58-70640.
Japanese Pat. Abstract, vol. 7, No. 162, E-187, 7/15/83, 58-70642.
English Translations of Japanese publications, 60-1008; 60-1009; 60-1010; 60-1011; 60-1012; 59-195811.
English Translation of German patent 1949828 (submitted earlier).
Abstract of 55-88407, Antenna Device, 7/4/1980.
Abstract of 60-169204, on Vehicle Antenna System, 9/2/1985.
Abstract of 60-172804, Antenna System for Vehicle, 9/6/1985.

*Primary Examiner*—William L. Sikes
*Assistant Examiner*—Doris J. Johnson
*Attorney, Agent, or Firm*—Cushman, Darby & Cushman

GAP BETWEEN RETAINER AND REAR WINDOW FRAME ($\times 10^{-3} \times$ WAVELENGTH)

FIG. 9
(A)
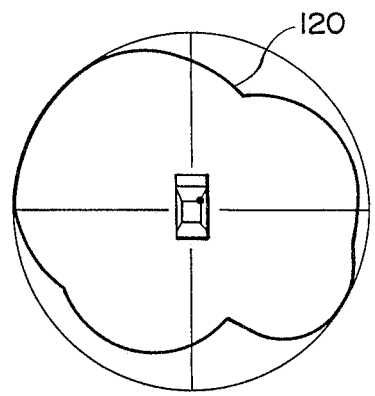
(B)
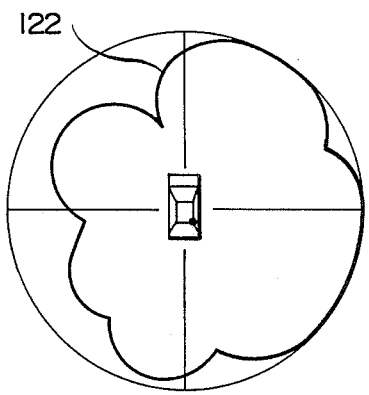
FIG. 10
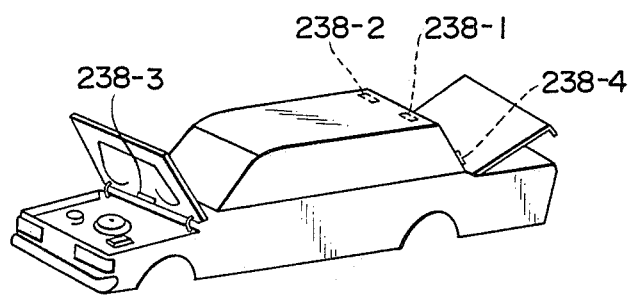

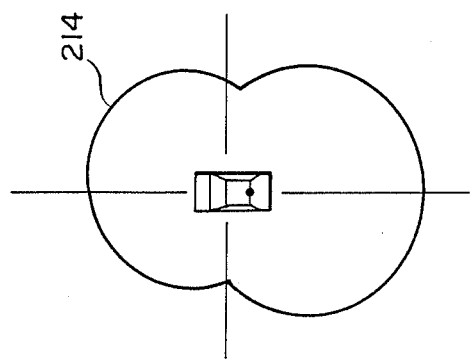
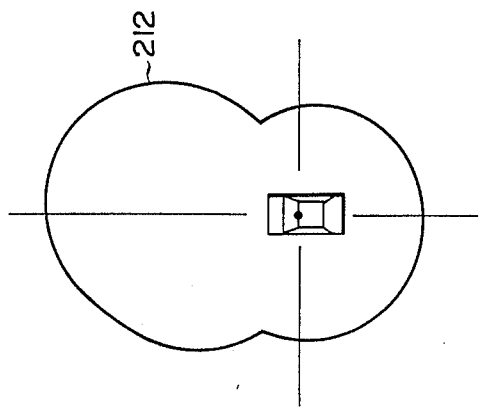
FIG. 16

FIG. 18
(A)
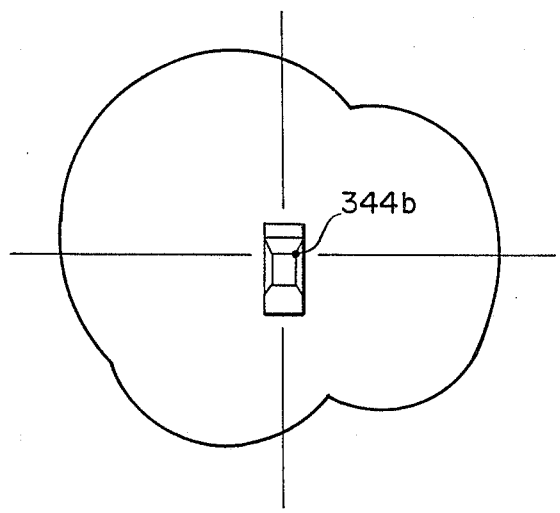
(B)
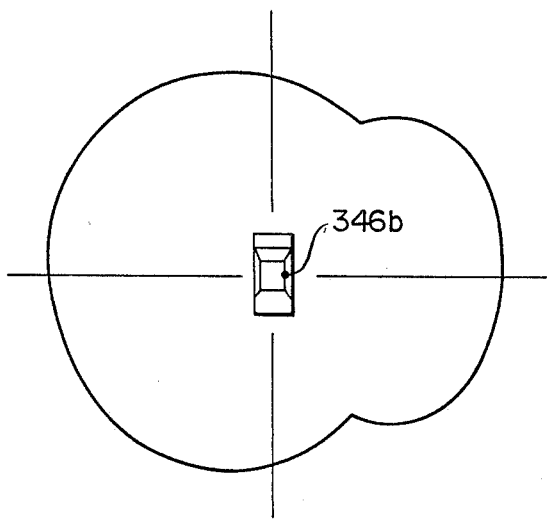

FIG. 25
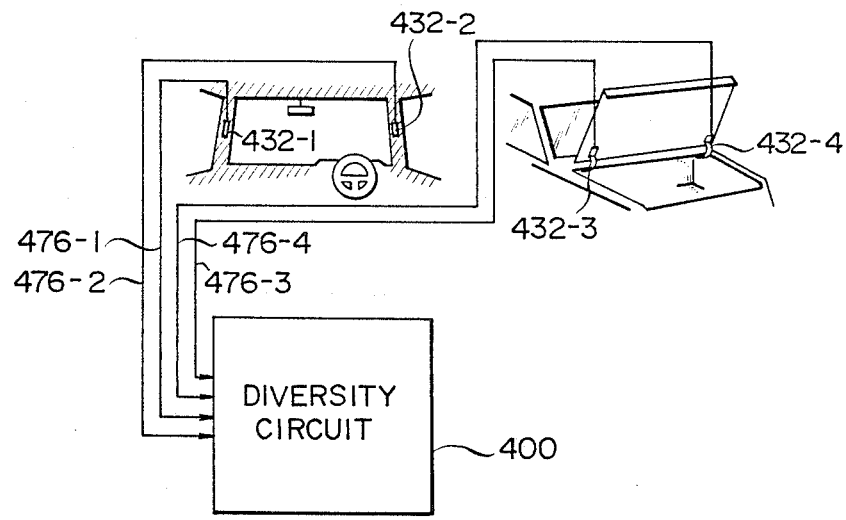
FIG. 28
(A) 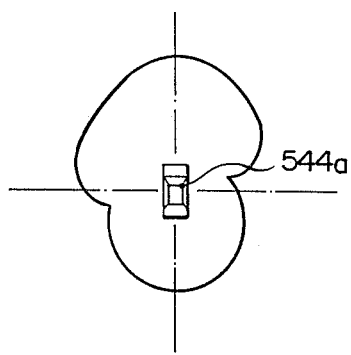
(B) 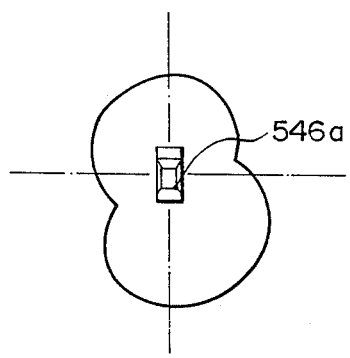

FIG. 26
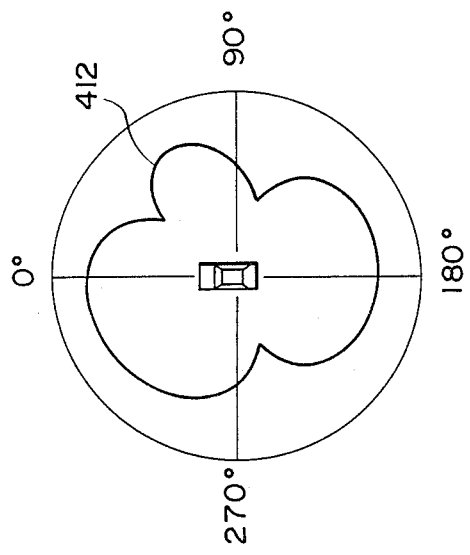
(B)
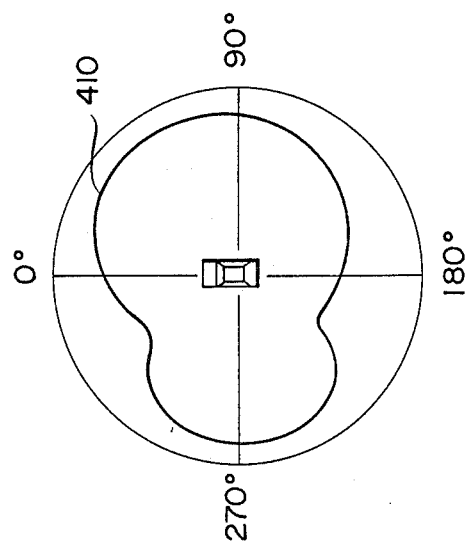
(A)

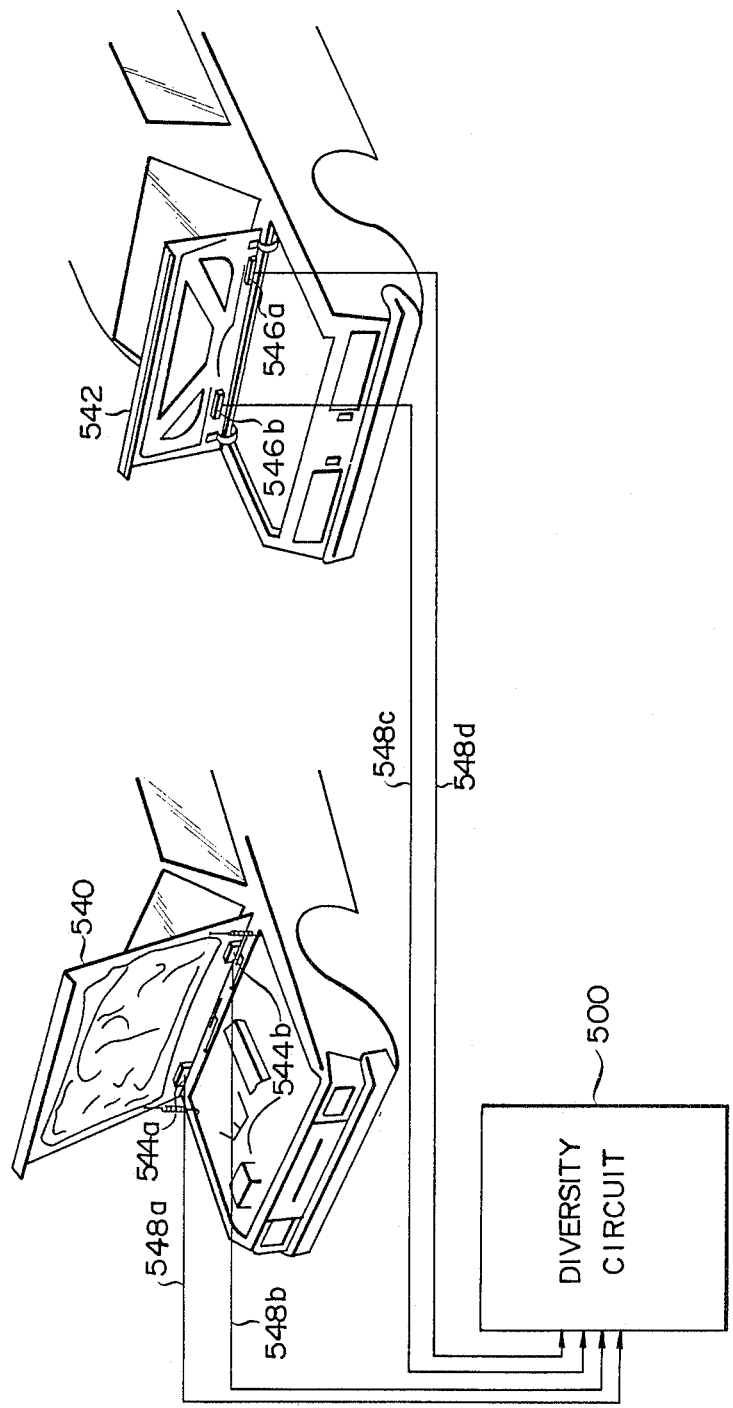

AUTOMOBILE TV ANTENNA SYSTEM

BACKGROUND OF THE INVENTION

1. Field of the Invention

The present invention relates to an automobile TV antenna system which uses a high-frequency pickup, and more particularly, to an improved automobile TV antenna system which is capable of performing diversity reception of TV broadcast waves. The system uses a TV antenna in which reception is optimized by an appropriate switch-over between a plurality of pickups. The pickups detect the surface currents induced by the broadcast waves which are received by a vehicle body.

2. Description of the Prior Art

These days, TV sets are often installed in automobiles etc., and such TV sets are used not only for receiving TV broadcasts but also for indicating various data with respect to vehicles.

Such an automobile TV separates a receiving signal consisting of TV broadcast waves into a video signal and a sound signal, and when the vehicle speed is stationary or below a predetermined speed, namely, when the vehicle is in the parking mode, the TV outputs both the video signal and the sound signal, while when the vehicle is running at more than a predetermined speed the TV only outputs the sound signal.

In such a TV set, the reception performance varies in accordance with the running state of the vehicle, which produces the problem of intermittent deterioration of the picture quality.

That is, high-frequency waves in the VHFLO band (90 to 108 MHz), VHFHi band (170 to 220 MHz), or UHF band (440 to 770 MHz) (these frequencies are used in Japan), such as TV broadcast waves, have a strong tendency to suffer from rectilinear propagation, so that direct waves and other waves interfere with each other as a result of bouncing off buildings, hillsides or other obstacles and this phenomenon produces distortion. Furthermore, in the case of a vehicle which is parked, the disturbance created by the waves generated by passing vehicles can cause multipath noise such as momentary interruption of sound during TV broadcast wave reception. An automobile antenna system having only a single antenna is unable to reduce such multipath noise during of TV broadcast wave reception.

Furthermore, it is difficult to receive TV broadcast waves stably, even if the sound of the TV broadcast is received, by a conventional pole antenna, during movement of a car. This is true, because due to the directivity of the antenna, the reception performance antenna changes in accordance with the change in direction from which the broadcast waves are received as a result of the automobile changing direction.

To solve this problem, a diversity-reception type automobile TV antenna system has been known, in which at least two antennas are disposed on the vehicle body at predetermined intervals so that the receiving operation is automatically taken over by the antenna having superior reception by performance whereby the directivity of the antenna is improved and the amount of multipath noise is lowered.

However, a conventional antenna is generally a pole antenna which projects outwardly from the vehicle body, and although it is superior in performance in its own way, it always remains a nuisance from the viewpoint of vehicle body design.

Especially, when diversity reception is performed by an automobile TV antenna system, a plurality of antennas are required. As a result, the aesthetic appearance of the automobile is disadvantageously damaged, and the receiving performance is greatly deteriorated by electrical interference between the antennas.

Another type of improved TV antenna system has been proposed which detects the surface currents induced on a vehicle body by broadcast waves.

Although utilization of currents which flow on the vehicle may apparently be the most reliable and efficient means, experiments carried out heretofore have shown very unfavorable results.

The first reason why the surface currents on an ordinary vehicle body cannot be effectively utilized is that the value of the surface currents has proved to be lower than expected so that it has not been possible to obtain a detecting output from the surface currents on the roof panel of a vehicle body (the portion mainly used for detection) that is at a high enough level.

The second reason is that the surface currents often have noise mixed therein. This noise is mainly produced by the engine ignition system of the vehicle and its battery charging regulator system, and it leaks into the vehicle body during the operation of the engine. It is therefore impossible to realize reception of broadcast waves in a clear enough manner for this system to be put to practical use.

As described above, a TV antenna system which detects the currents induced on a vehicle body by broadcast waves is not always successful.

Thus, to date, the problems relating to the design of a pickup structure suitable for efficiently detecting the currents flowing on a vehicle body which are induced by broadcast waves and the question of how to arrange the necessary pickups in such a manner as to ensure a good S/N ratio for practical use have not been fully solved.

In particular, the high-frequency directional characteristics of a high-frequency pickup as an antenna is poor, and further multipath noise is likely to be produced in the reception of FM broadcast waves of high frequency such as those in the VHF band.

SUMMARY OF THE INVENTION

Accordingly, it is an object of the present invention to eliminate the above-described problems and to provide an improved automobile TV antenna system which is capable of effectively detecting the currents induced on a vehicle body by broadcast waves by means of a diversity reception system for delivering it to a TV set installed in the vehicle.

To achieve this aim, an automobile TV antenna system according to the present invention is provided with a plurality of high-frequency pickups for effectively picking up high-frequency surface currents which are induced on a vehicle body by broadcast waves and which flow concentratedly on the marginal edge portion of the vehicle body, thereby enabling automatic selection from among these pickups enjoying the best reception at any given time.

A preferred embodiment of the present invention is an antenna system which is especially suitable for a vehicle provided with a retainer on which an edge molding is mounted (hereinunder referred to as "edge molding retainer"), the retainer being secured to a roof panel as a separate element in relation to a rear window frame and a header inner panel.

The retainer is attached to the vehicle body substantially horizontally thereto. The length of the retainer is equivalent to about half a wavelength with respect to a lower band (90 to 108 MHz) of the VHF band, about one wave length with respect to a higher band (170 to 222 MHz) of the VHF band, and about two to four wavelengths with respect to the UHF band (440 to 770 MHz). A high-frequency pickup is longitudinally disposed in close proximity to the peripheral edge of the retainer.

In other words, the length of the edge molding retainer is set at a length which facilitates the resonance of the surface currents flowing on the marginal edge portion of a vehicle body with respect to the frequency of 50 MHz or more. This retainer is disposed apart from the rear window frame by a distance of about $2 \times 10^{-3} \times$ wavelength, thereby enhancing the degree of concentration of the currents flowing on the marginal edge portion of the vehicle body, and a loop antenna of a high-frequency pickup is longitudinally disposed in the vicinity of the edge of the retainer.

In addition, a loop antenna of a high-frequency pickup is also disposed on a pillar in the front portion of the vehicle body which has an adequately large elevation in comparison with the edge molding retainer, thereby improving the directional characteristics of the automobile antenna system.

In the automobile TV antenna system having the aforementioned structure, since the retainers constitute a horizontal plane with respect to the vehicle body and the pillars are so disposed as to have a larger angle of elevation with respect to the vehicle body than the retainer, the pickups disposed at these positions compensate for each other in terms of the polarizing characteristics of the waves. Thus an automobile antenna system having good directional characteristics is realized.

According to another aspect of the present invention, the edge molding retainer with a length appropriate for facilitating the resonance of the surface currents flowing on the marginal edge portion of a vehicle body with respect to the frequency of 50 MHz or more is disposed apart from the rear window frame by a distance of about $2 \times 10^{-3} \times$ wavelength, and the loop antenna of the high-frequency pickup is longitudinally disposed at predetermined positions in proximity to the edge molding retainer, the engine hood and the trunk lid.

In such an automobile TV antenna system, since each of the high-frequency pickups is spaced apart from the others with respect to the direction in which the vehicle travels, the advantageous effect of a space diversity antenna is obtainable.

In still another aspect of the present invention, high-frequency pickups are longitudinally disposed at least at the front pillars or the center pillars, on both sides of the vehicle body, thereby constituting a diversity reception system.

A conventional antenna system is mainly aimed at reception of AM waves. However, the wavelength of such broadcasting waves is too long for the antenna which detects the currents on a vehicle body, and good receiving properties cannot be obtained with respect thereto.

The present inventors took notice of these frequency dependency characteristics, and the broadcast waves which the present invention aimed to deal with are limited to the TV broadcast waves, namely high-frequency broadcast waves of more than 90 MHz. This approach has enabled very effective reception, from the currents on a vehicle body, to be obtainable, which has conventionally been considered to be impossible.

In the present invention, high-frequency pickups are provided at certain portions of the vehicle body at which noise is unlikely to be picked up and at which the density of broadcast waves is high, since the high-frequency currents vary at different locations on the vehicle body. For example, the front pillar and the center pillar may be selected as portions which meet these conditions.

Accordingly, in an automobile TV antenna system according to the present invention, the high-frequency pickup which enjoys the optimum receiving sensitivity at any given time is always selected from among the pickups available. Furthermore since the antenna characteristic of all of the high-frequency pickups are non-directional, a combination of these pickups enables non-directional space diversity reception.

In a typical automobile, the space between the right and left pillars is about 1.5 m and the space between the front pillar and the center pillar is about 0.8 m. This satisfies the condition that the antennas should be so disposed that the distance between them is more than $\lambda/4$ to $\lambda/2$ (wherein $\lambda$ represents wavelength) in order to obtain space diversity effects. Consequently, the present invention provides a very effective space diversity antenna system for TV broadcast waves.

In a further aspect of the present invention, loop antennas of high-frequency pickups are longitudinally provided in proximity to the right and left front pillars and the right and left trunk hinges, thereby constituting a diversity antenna for receiving TV broadcast waves.

The outputs from the high-frequency pickups attached to the front pillars have good directional characteristics with respect to the lateral direction of the vehicle body, and the outputs from the high-frequency pickups disposed at the trunk hinges have good directional characteristics with respect to the longitudinal direction of the vehicle body. Therefore, these high-frequency pickups can together compensate for any degradation of sensitivity in accordance with the direction in which broadcast waves are received, whereby the best possible TV reception is enabled.

In a still further aspect of the present invention, high-frequency pickups are longitudinally provided in proximity to the side peripheral edge portions of the engine hood and the trunk lid, at least, thereby constituting a diversity reception system.

In a typical automobile, the space between the side peripheral edge portions of the engine hood and the trunk lid is about 1.5 m and the space between the engine hood and the trunk lid is about more than 2 m. This satisfies the condition that the antennas should be so disposed that the distance between them is more than $\lambda/4$ to $\lambda/2$ (wherein $\lambda$ represents wavelength) in order to obtain space diversity effects. Consequently, the present invention provides a very effective space diversity antenna system for TV broadcast waves.

The above and other objects, features and advantages of the present invention will become clear from the following description of the preferred embodiments thereof, taken in conjunction with the accompanying drawings.

BRIEF DESCRIPTION OF THE DRAWINGS

FIGS. 9A and 9B show the directional patterns of antennas of the first embodiment in the TV bands;

FIG. 10 illustrates the entire part of a second embodiment of an automobile TV antenna system of the present invention, showing the arrangement of high-frequency pickups;

FIGS. 16A and 16B show the directional patterns of antennas of the second embodiment in the TV bands;

FIGS. 18A and 18B are explanatory views of the directional patterns of high-frequency pickups in the third embodiment;

FIG. 25 is an explanatory view of the diversity circuit which is used in the fourth embodiment;

FIGS. 26A and 26B shows the directional patterns of high-frequency pickups in the fourth embodiment;

FIG. 27 is a block diagram of the schematic structure of a fifth embodiment of an automobile TV antenna system according to the present invention;

FIGS. 28A and 28B are explanatory views of the directional patterns of the high-frequency pickups in the fifth embodiment;

DESCRIPTION OF THE PREFERRED EMBODIMENTS

Preferred embodiments of an automobile TV antenna system according to the present invention will be explained hereinunder with reference to the accompanying drawings FIGS. 33 to 38 illustrate a process for examining the distribution characteristics of high-frequency currents so as to ascertain the location at which an antenna system can operate most efficiently on the vehicle body of an automobile.

Figure 33:
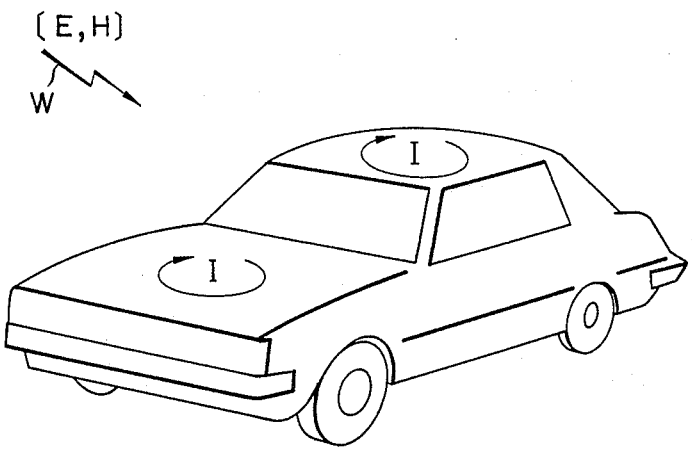
FIG. 33 is an explanatory view of the surface currents I produced on the vehicle body B by external TV broadcast waves W.

FIG. 33 shows that when external electromagnetic waves W, such as broadcast waves, pass through the vehicle body B of conductive metal, surface currents I are induced at various vehicle locations at levels corresponding to the intensities of electromagnetic waves passing therethrough. The present invention aims at only electromagnetic waves of relatively high frequency bands in excess of 50 MHz, such as FM broadcast waves and TV waves.

The present invention is characterized in that the distribution of the surface currents induced on the vehicle body by electromagnetic waves within the above-described particular wave bands is measured so as to seek a location on the vehicle body which is higher in surface current density and lower in noise and at which a pickup used in the present invention is located.

The distribution of surface currents is determined by a simulation using a computer and also by measuring actual intensities of surface currents at various locations on a vehicle body. In accordance with the present invention, the measurement is carried out by the use of a probe which can operate in accordance with the same principle as that of a high-frequency pickup actually located on the vehicle body at a desired location, as will be described later. Such a probe is moved on the vehicle body throughout the entire surface thereof to measure the level of surface currents at various locations of the vehicle body.

Figure 34:
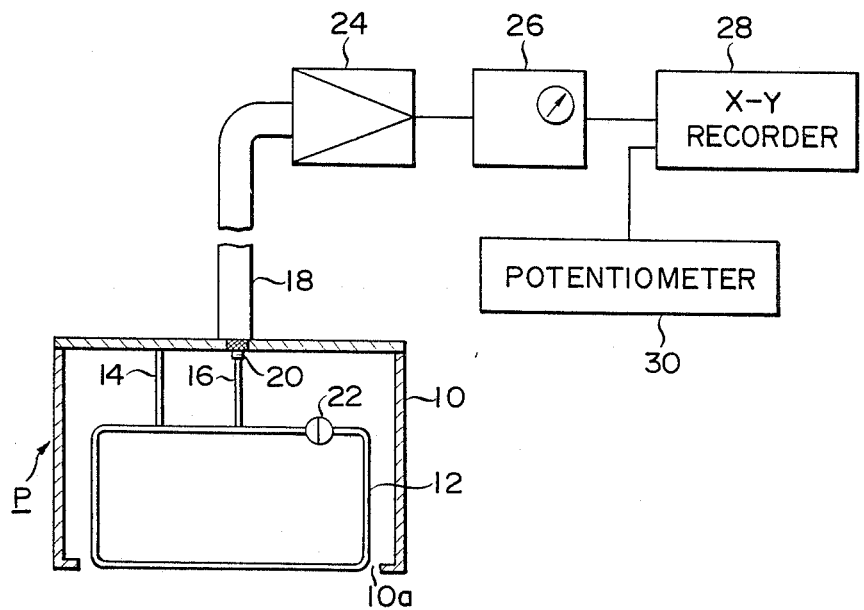
FIG. 34 illustrates a probe for detecting the distribution of surface currents on the vehicle body and having the same construction as that of the high-frequency pickup used in the present invention, and a circuit for processing signals from the probe.

FIG. 34 shows an example of such a probe P which is constructed in accordance with substantially the same principle as that of the high-frequency pickup described hereinafter. The probe P is composed of a casing 10 of electrically conductive material for preventing any external electromagnetic wave from transmitting to the interior thereof and a loop coil 12 fixed within the casing 10. The casing 10 includes an opening 10a formed therein through which a portion of the loop coil 12 is externally exposed. The exposed portion of the loop coil 12 is positioned in close proximity to the surface of the vehicle body B to detect magnetic flux induced by surface currents on the vehicle body B. Another portion of the loop coil 12 is connected with the casing 10 through a short-circuiting line 14. The loop coil 12 further includes an output end 16 connected with a core 20 in a coaxial cable 18. Still another portion of the loop coil 12 includes a capacitor 22 for causing the frequency in the loop coil 12 to resonate relative to the desired frequency to be measured to increase the efficiency of the pickup.

Thus, when the probe P is moved along the surface of the vehicle body B and also angularly rotated at various locations of measurement, the distribution and direction of surface currents can accurately be determined at each of the vehicle locations. In FIG. 34, the output of the probe P is amplified by a high-frequency voltage amplifier 24 and the resulting output voltage is measured by a high-frequency voltmeter 26. This coil output voltage is read at the indicated value of the high-frequency voltmeter 26 and also is recorded by an XY recorder 28 to provide the distribution of surface currents at various vehicle locations. The input of the XY recorder 28 receives signals indicative of various vehicle locations from a potentiometer 30 to recognize the value of high-frequency surface currents at the corresponding vehicle location.

Figure 35:
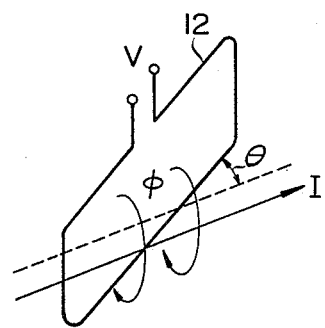
FIG. 35 illustrates the electromagnetic coupling between the surface currents I and the loop coil of a pickup.
Figure 36:
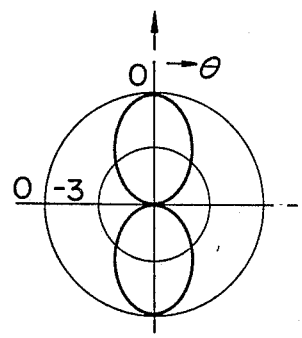
FIG. 36 illustrates the directional pattern of the loop coil in FIG. 35.

FIG. 35 illustrates an angle θ of deflection between the high-frequency surface currents I and the loop coil 12 of the pickup. As is clear from the drawing, magnetic flux φ intersects the loop coil to generate a detection voltage V in the loop coil 12. As shown in FIG. 36, when the angle θ of deflection is equal to zero, that is, the surface currents I are parallel to the loop coil 12 of the pickup, the maximum voltage can be obtained. The direction of the surface currents I when the probe P is rotated to obtain the maximum voltage can also be known.

Figure 37:
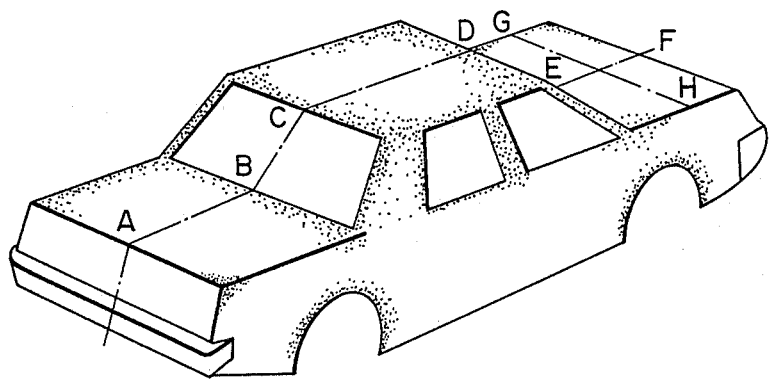
FIG. 37 illustrates the intensity distribution of the surface currents on the vehicle body.
Figure 38:
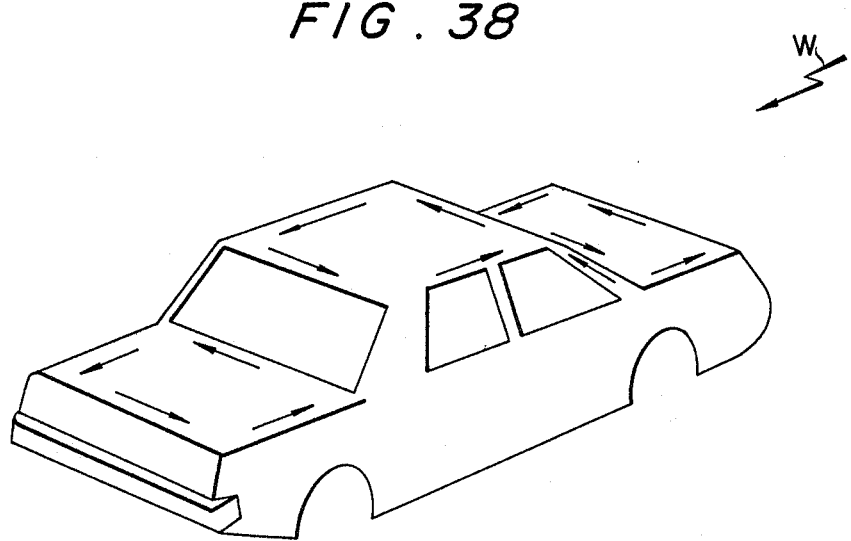
FIG. 38 shows the directions of the flow of the surface currents on the vehicle body.

FIGS. 37 and 38 respectively show the magnitude and direction of high-frequency surface currents induced at various different locations of the vehicle body at the frequency of 80 MHz, the values of which are obtained from the measurements of the probe P and the simulation effected by the computer. As is clear from FIG. 37, the distribution of surface currents has higher densities at the marginal edge of the vehicle body and lower densities at the central portion of the flat vehicle panels.

It will also be apparent from FIG. 38, that the surface currents are concentrated in the direction parallel to the marginal edge of the vehicle body or in the direction along the connections of various flat panels.

In an embodiment of the present invention, a plurality of high-frequency pickups, e.g., loop antennas, constituting a diversity antenna are longitudinally disposed along respective peripheral edges of the edge molding retainers and pillars at the front portion of the vehicle body. In order to obtain very good sensitivity adequate for practical use, the pickup is preferably disposed apart from the edge at a distance which is within a range which depends upon the carrier frequency of the broadcast waves.

Figure 39:
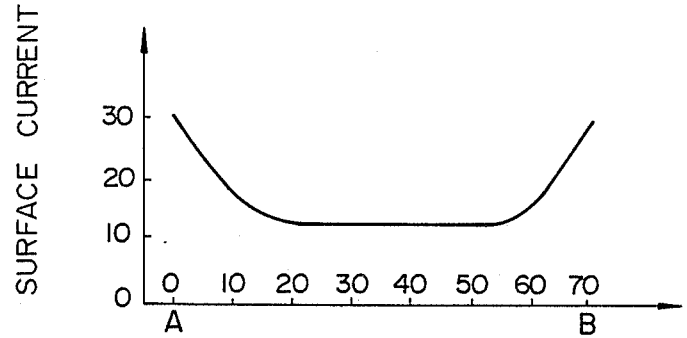
FIGS. 39 and 40, respectively, show the distributions of the currents along the vertical sections of the vehicle body shown in FIG. 37.
Figure 40:
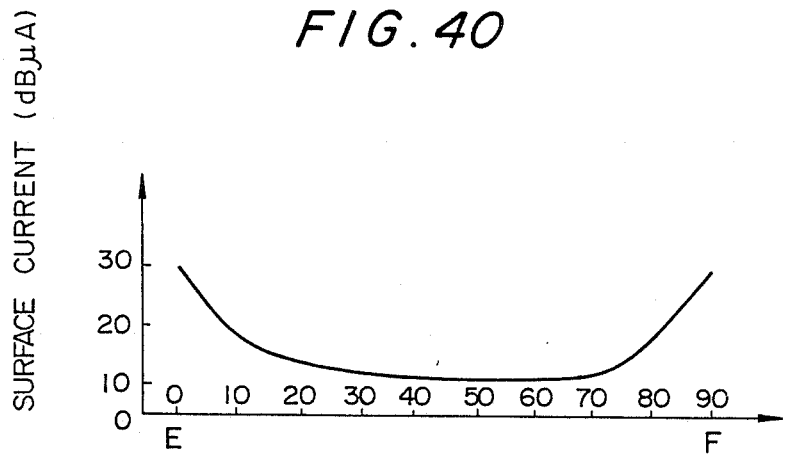

The distribution of the currents induced on the metal portion of the vehicle body shown in FIG. 37 is examined in detail with respect to what occurs along the broken lines shown, the resulting distribution characteristics are shown in FIGS. 39 and 40.

FIG. 39 shows the distribution of the surface currents along the trunk lid, namely, the line A - B in FIG. 37. As is obvious from the curve, the largest currents flow at both ends of the trunk lid and the value decreases toward the center of the trunk lid.

Accordingly, it will be understood from FIG. 39 that if a high-frequency pickup is disposed in the vicinity of the peripheral edge of the trunk lid, it is possible to detect the currents which flow concentratedly there.

Similarly, FIG. 40 shows the distribution of the currents along the line C - D of the engine hood in FIG. 37. As is clear from the graph, the largest currents flow at both ends of the engine hood and the value of the current decreases toward the center thereof.

Thus, it will be understood that according to the present invention, it is possible to pick up broadcast waves with good sensitivity in the vicinity of each marginal edge portion of the vehicle body.

In another embodiment of the present invention, the high-frequency pickups are provided in proximity to the peripheral edges of each of these lid bodies, with the longitudinal direction of, e.g., the loop antenna in parallel to the longitudinal direction of the lid bodies. In order to obtain very good sensitivity adequate for practical use, the pickup is preferably disposed apart from the edge at a distance which is within the range which depends upon the carrier frequency of the broadcast waves.

FIGS. 39 and 40 show the distribution characteristics of currents on the vehicle body with respect to TV broadcasts of 90 MHz. The value of the current decreases in correspondence with the distance from the edge of the vehicle body. Since the range under 6 db is the lower limit for currents in which good sensitivity is actually obtainable, it is understood that very good sensitivity may be obtained if the pickup is disposed within a distance of 4.0 cm from the peripheral edge.

Accordingly, in the present invention, if a high-frequency pickup is disposed within a distance of 4.0 cm inward of the peripheral edge of the metal lid bodies, an antenna system adequate for practical use is obtained.

It is found from the computer's simulation and various experimental measurements that the distance between the position where the high-frequency pickup is mounted and the marginal edge of the vehicle body and the distance which is suitable for practical use depends upon the carrier frequency used therein. It is also recognized that the distance is decreased as the value of the carrier frequency is increased.

From the fact that the suitable distance of 4.0 cm from the corresponding marginal vehicle portion is inversely proportional to the value of the carrier frequency, good results can be obtained relative to the respective values of the carrier frequency if the high-frequency pickup is spaced away from the peripheral edge of a metal lid body within a distance represented by the following formula:

$$12 \times 10^{-3} c/f(m)$$

wherein c=the velocity of light and f=carrier frequency.

As described above, according to the present invention, the high-frequency pickup is provided in close proximity to the peripheral edge portion of a metal lid body and preferably within the above-described distance from the peripheral edge, whereby good receiving operation is ensured.

In the present invention, since that distance suitable for practical use depends upon the carrier frequency, if, for example, the carrier frequency is 100 MHz, a high-frequency pickup is disposed within a distance of 3.6 cm inward of the peripheral edge of a lid body, and with increases of the carrier frequency f, the position the high-frequency pickup is disposed is limited to a narrow range which is very close to the edge portion of the lid body.

Figure 41:
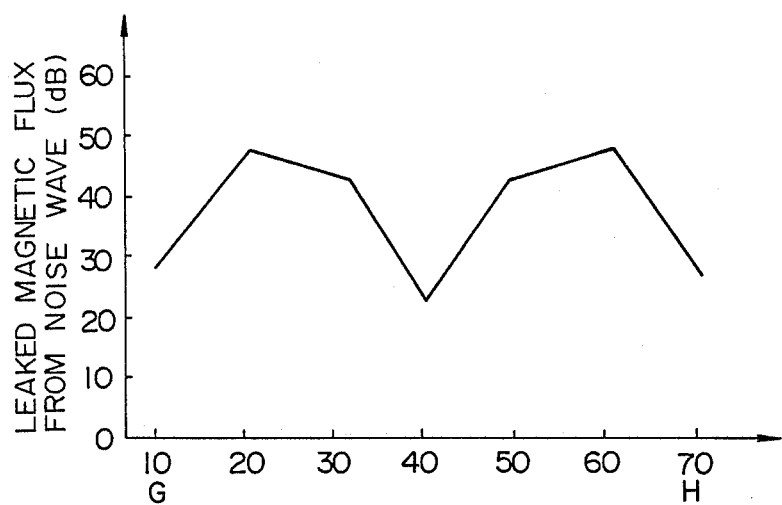
FIG. 41 is a characteristic curve of the distribution of noise currents along the transverse line G - H in FIG. 37.
Figure 42:
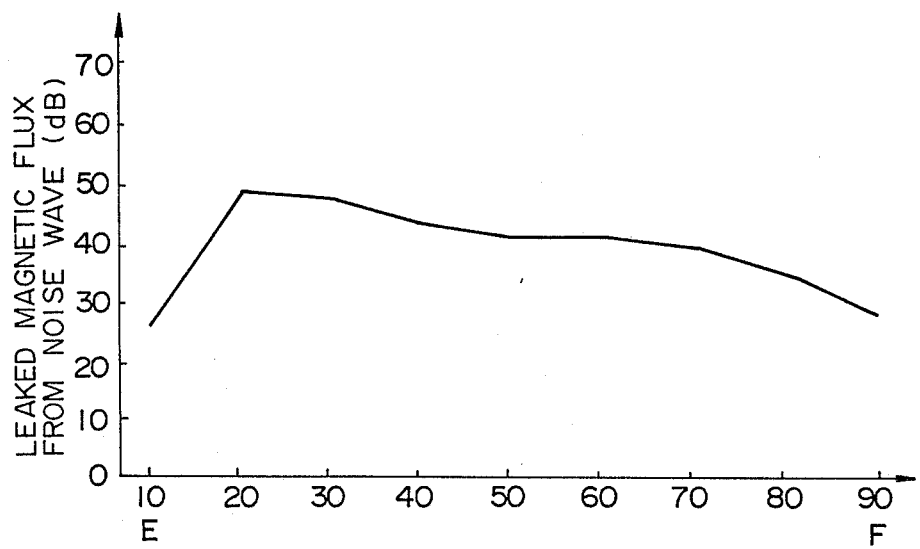
FIG. 42 is a characteristic curve of the distribution of noise currents along the line E - F in FIG. 37.

FIGS. 41 and 42 show the measured results of the distribution characteristics of noise current.

FIG. 41 shows the distribution of the noise current on the transverse line G - H in FIG. 37. As is clear from the graph, the value of the noise current is lowered at the center. Therefore, as to the engine hood, if the high-frequency pickup is disposed at both end portions or in the central portion thereof, it is possible to detect high-frequency surface currents with a low degree of noise.

FIG. 42 shows the distribution of the noise current along the line E - F in FIG. 37. As is obvious from the graph, the value of the noise current takes the minimum vale at both end portions.

The present invention is made upon the above-described finding, and high frequency pickups are preferably longitudinally disposed at positions where the surface currents are concentrated with high density and the value of the noise current is very low, for example, on the side peripheral portions of the engine hood and the trunk lid.

First Embodiment

Figure 1:
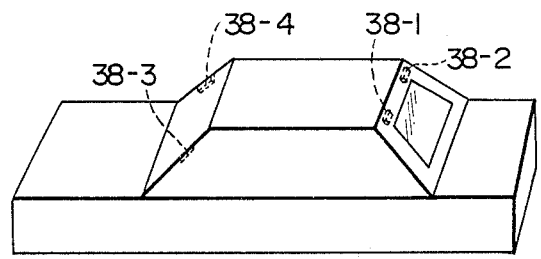
FIG. 1 shows the entire part of a first embodiment of an automobile TV antenna system of the present invention, showing the arrangement of high-frequency pickups.
Figure 2:
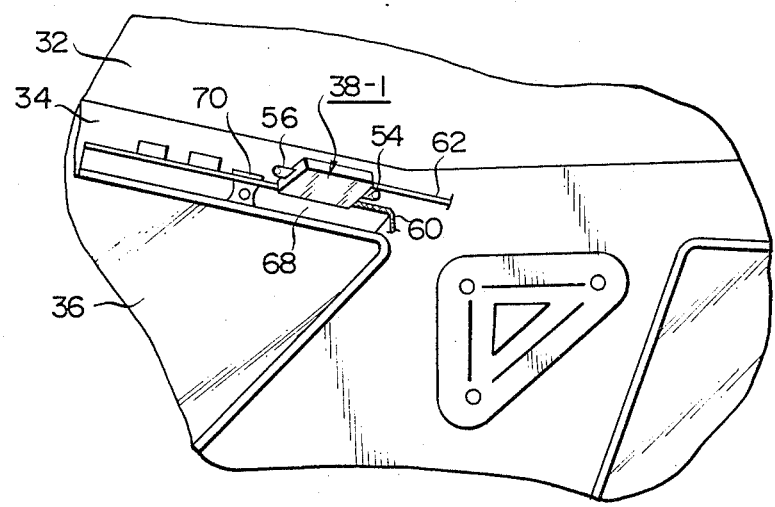
FIG. 2 shows a high-frequency pickup incorporated in the diversity antenna system shown in FIG. 1, in the state of being mounted on the roof panel at the rear portion of the vehicle body.
Figure 3:
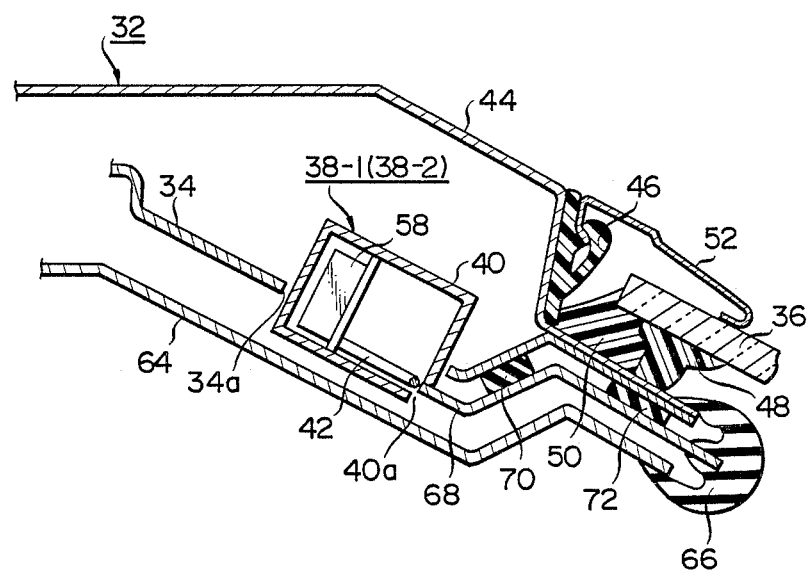
FIG. 3 is a cross sectional view of the pickup shown in FIG. 2, showing the attachment structure of the main part thereof.

FIG. 1 shows a first embodiment of the present invention. The arrangement of four high-frequency pickups 38 - 1 to 38 - 4 which constitute the diversity antenna in this embodiment is shown. The high-frequency pickups 38 - 1 to 38 - 4 are provided on the rear portion and the front portion, respectively, of the vehicle body. FIGS. 2 and 3 show the high-frequency pickups which are disposed in proximity to the peripheral edge of the rear window glass.

In FIG. 2, a roof panel is shown in the exposed state. The metal roof panel 32 is connected to a rear window glass 36 through a rear window frame 34. In this embodiment, the high-frequency pickups 38 - 1 and 38 - 2 are disposed on the right and left edge molding retainers 68, respectively.

FIG. 3 is a cross sectional view of the high-frequency pickup 38 in the mounted state. The high-frequency pickup 38 includes a metal casing 40 which shields a loop antenna 42 provided therewithin from external magnetic flux, thereby constituting an electrostatic magnetic coupling type pickup having a structure similar to the above-described probe which includes a loop coil.

In FIG. 3, a roof panel 32 includes a roof panel 44, and the rear window frame 34 is secured to one end of the roof panel 44. The rear window glass 36 is secured to the roof panel 44 through a fastener 46 and a dam 48, these two being air-tightly bonded by an adhesive 50.

A molding 52 is fixed between the roof panel 44 and the rear window glass 36.

A roof garnish 64 is secured to the roof panel 44 on the inside of the rear window frame 34, namely, on the inside of the vehicle body, and an edge molding 66 is secured extendingly to both of one side end portion of the roof garnish 64 and the rear window frame 34.

An edge molding retainer 68 is provided between the rear window frame 34 and the roof garnish 64 in order to mount the edge molding 66.

The retainer 68 is separated from the rear window frame 34 by spacers 70 and 72, thereby promoting the concentration of surface currents.

Figure 4:
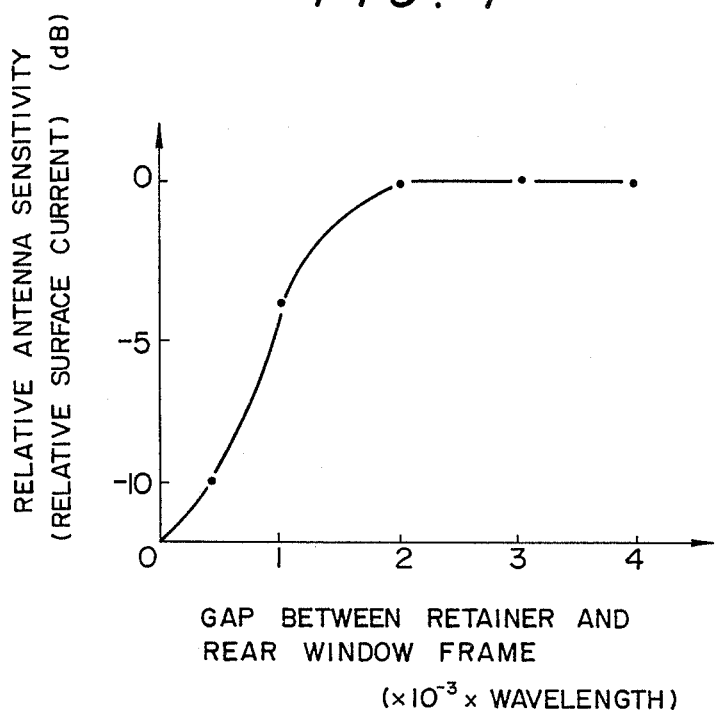
FIG. 4 shows the change in relative antenna sensitivity with respect to the space between the rear window frame and the retainer.

FIG. 4 shows a change in antenna sensitivity, namely, the changed value of the density of surface currents in relation to the space between the rear window frame 34 and the retainer 68. As is clear from the graph, the density of the surface currents reaches its maximum when the space is about $2 \times 10^{-3} \times$ wavelength. That is, the degree of concentration of currents which flow on the marginal edge portion is enhanced by separating the retainer 68 from the rear window frame 34 by the distance corresponding to that value.

In this embodiment, an opening 34a is provided on a part of the rear window frame 34 in order that the casing 40 of the high-frequency pickup 38 may be inserted into the opening 34a, whereby the loop antenna 42 of the high-frequency pickup 38 is opposed to the peripheral edge portion of the rear window frame 34.

Since the retainer 68 is a distance of about $2 \times 10^{-3} \times$ wavelength apart from the rear window frame 34, as described above, and this distance is approximately equal to about $2 \sim 4 \times$ wavelengths with respect to the UHF band, the tendency of surface currents to concentrate there is further strengthened, thereby enabling high-sensitivity reception.

Figure 5:
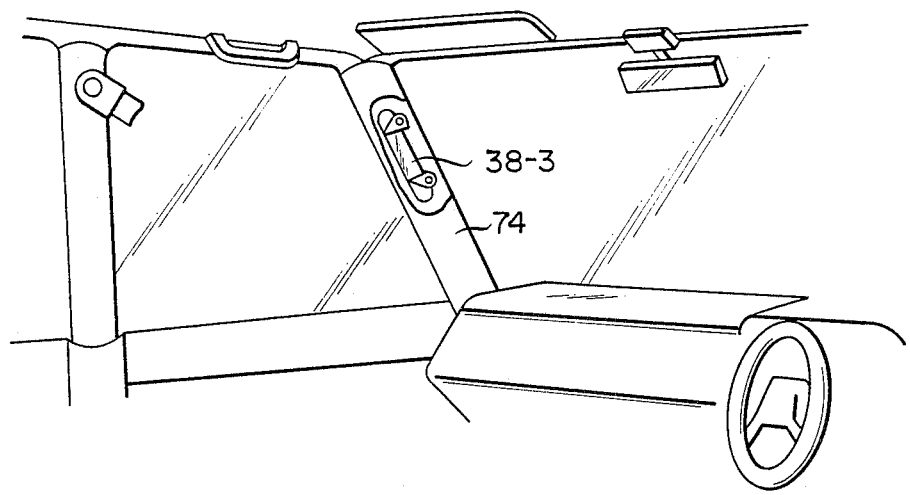
FIG. 5 is a schematic view of a first embodiment of the present invention, showing a high-frequency pickup incorporated in the diversity antenna system in the state of being mounted on the front pillar of the vehicle body.
Figure 6:
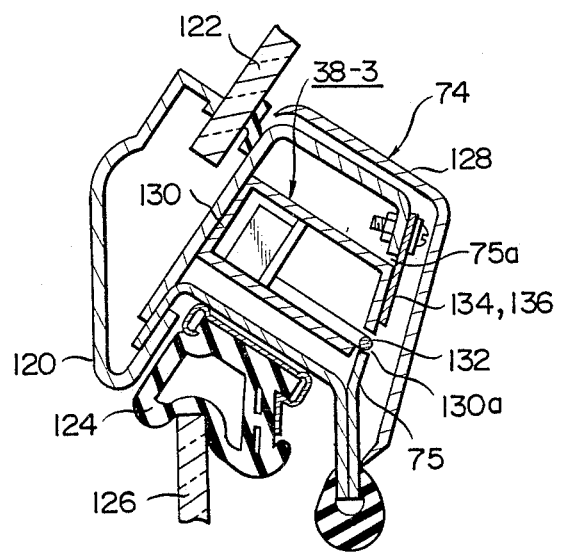
FIG. 6 is a cross sectional view of the pickup shown in FIG. 5, explaining the attachment structure of the main part thereof.

FIG. 5 illustrates the schematic structure of the high-frequency pickup which is provided on a front pillar 74 which supports the roof panel, and FIG. 6 is a cross sectional view thereof.

The front pillar 74 includes a hollow prism as its main pillar and a pedestal plate 75.

A windshield molding 120 is secured to the side surface of the pedestal plate 75 which faces the exterior of the vehicle body, and the front windshield glass 122 is retained by the windshield molding 120.

A weather strip rubber 124 is secured to the surface of the pedestal plate 75 which faces the rear portion of the vehicle body, thereby maintaining the watertightness of the joint between a side window glass and the pedestal plate 75.

Furthermore, a front pillar garnish 128 is mounted on the surface of the pedestal plate 75 which faces the interior of the vehicle body, so as to maintain the aesthetically pleasing appearance of the pillar 74 by enclosing the surface of the pedestal plate 75.

In the present invention, the high-frequency pickup 38 - 3 is longitudinally disposed on the front pillar 74, and in this embodiment, the pickup 38 - 3 is inserted into the hollow portion of the pedestal plate 75.

The high-frequency pickup 38 - 3 is composed of a casing 130 of a conductive material and a loop antenna 132 provided therewithin, as is obvious from FIGS. 5 and 6. The casing 130 for shielding the loop antenna from external electromagnetic field is provided with an opening 130a at one side thereof. The loop antenna 132 is exposed from the opening 130a and is disposed in proximity to the pillar pedestal 75 on which high-frequency surface currents flow concentratedly.

In order to insert the high-frequency pickup 38 - 3 into the hollow prism of the pillar pedestal 75, an opening 75a is provided on a part of the pillar pedestal 75. The high-frequency pickup 38 - 3 is inserted into the pillar 74 before the front garnish 128 is fixed.

In order to secure the casing 130 of the high-frequency pickup 38 - 3 to the pedestal plate 75, brackets 134 and 136 are fixed to both sides of the casing 130 by spot welding or the like, and the brackets 134 and 136 are tightly screwed to the pedestal plate 75.

Although the high-frequency pickups 38 - 3 and 38 - 4 are provided on the right and left front pillars 74, respectively, the location of the pickups is not limited to this, and, they may be disposed, for example, on the center pillars.

The structure of the circuit in which broadcast waves are received by the pickup enjoying the optimum reception which is automatically selected from among the pickups 38 - 1 to 38 - 4 will now be explained with reference to FIG. 7.

Two TV antennas each of which consists of a high-frequency pickup 38 - 1, 38 - 2, 38 - 3, or 38 - 4, are provided both on the front pillars and on the roof panel on the rear portion of the vehicle body, and the receiving signals of these four high-frequency pickups are input to a switching circuit 78 of a diversity circuit by coaxial cables 76 - 1 to 76 - 4.

The switch circuit 78 performs changeover among these high-frequency pickups which are used for receiving TV broadcast waves by selecting a signal from those output by these four pickups 38 - 1 to 38 -4 and outputting it to a tuner 80.

The tuner 80 which selects a channel from the receiving signal is composed of a known circuit of high-frequency amplifier 82, a local oscillator 84 and a mixer 86.

After the channel selection by the tuner 80, the receiving signal is amplified by a video intermediate signal amplifier 88 and is output to a video display circuit 90 and a sound output circuit 92.

The video display circuit 90 has a known structure, namely, it is composed of a video detection circuit 94, a synchronizing deflection circuit 98 which is connected to a deflection circuit of a cathode-ray tube 102 through a vertical deflection and horizontal deflection circuitry, and a chromaticity circuit 100.

A video signal is detected by the video detection circuit 94 and amplified by the video amplifier 96, and thereafter it is displayed on the cathode-ray tube 102.

The sound output circuit 92 in this embodiment has also a known structure, namely, it is composed of a sound separation circuit 104, a sound intermediate frequency amplifier 106, a sound detection circuit 108 and a sound amplifier 110. The sound signal is separated from the signal output by the video intermediate frequency amplifier 88 and is detected to be output by a speaker 112.

In this manner, the automobile TV separates a receiving signal into the video signal and the sound signal, and displays the video signal on the cathode-ray tube and outputs the sound signal from the speaker 112.

The antenna system in this embodiment includes a driving state judgement circuit 114 and a switch 116 which is provided between the video detection circuit 94 and the video amplifier 96 so as to turn on and off the video signal. When the driving state judgement circuit 114 detects that the vehicle is stationary, it turns the switch 116 on, while when it detects that the vehicle is running it turns the switch 116 off.

Figure 8:
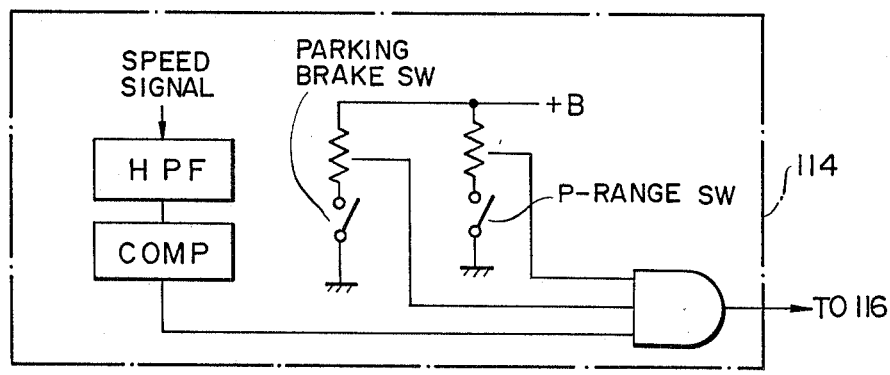
FIG. 8 is a detailed view of a driving state judgement circuit in FIG. 7.

FIG. 8 shows the circuit structure of the driving state judgement circuit 114. When both a parking position switch and a hand brake switch are on, and the vehicle speed is below a predetermined value, the circuit in this embodiment judges the vehicle is in the parking mode, and a high-level signal is output from AND gate to turn the switch 116 on. In the other cases, the circuit judges that the vehicle is in the running mode, and a low level signal is output from the AND gate to turn the switch 116 off.

The vehicle speed is detected by inputting a vehicle speed detection pulse into a comparator through a high pass filter and comparing thereby the pulse with a predetermined reference value.

Therefore, in the antenna system in this embodiment, when the vehicle is stationary, the switch 116 is on and therefore a picture is displayed on the cathode-ray tube 102, and sound is output from the speaker 112 On the other hand, when the vehicle is running, the switch 116 is off, and therefore no picture is displayed on the cathode-ray tube 102 and sound alone is output from the speaker 112.

In this way, the antenna system in this embodiment only outputs sound from the speaker, thereby preventing the attention of the driver from being distracted from driving to the picture displayed on the cathode-ray tube 102.

In such an automobile TV antenna system, since the receiving state of the antenna changes during the travel of the vehicle, a diversity reception system is adopted in order to obtain a good picture and sound. In this diversity reception system, the receiving operation is taken over, in correspondence with a change in the receiving state of waves, by the optimum pickup among the pickups 38 - 1 to 38 - 4 which enjoys the best reception by automatic changeover.

The switching circuit 78 for switching antennas changes the present antenna to the antenna which enjoys the optimum reception by an antenna switching circuit 118 which produces a switching signal 118a when the output of the video detection circuit 94 is lowered below a predetermined level.

It is also possible to switch the antenna on the basis of a sound detection output.

It is also possible to switch antennas during the flyback period with the antenna switching timing synchronized with a horizontal synchronizing signal 98a.

FIGS. 9A and 9B show the directional characteristic of the antenna in the TV band, exhibited when the high-frequency pickup is mounted on the right front pillar, and when it is mounted on the right rear portion, respectively.

The directional pattern of the antenna which is mounted on the front pillar is approximate to the configuration of the numeral 8, as is clear from FIG. 9B, and no sudden drop of output level (dipping point) is seen.

The directional pattern of the antenna mounted on the rear portion exhibits a good directional characteristic on the righthand direction, as is shown in FIG. 9B.

Furthermore, since the rear roof constitutes a horizontal plane with respect to the vehicle body and the front pillars have a larger angle of elevation than the rear roof with respect to the vehicle body, the pickups disposed at these positions compensate for each other in terms of the deflection characteristics of waves.

As described above, according to this embodiment, the best possible reception of TV waves is enabled by the diversity reception using a plurality of high-frequency pickups and thereby compensating together for any degeneration of sensitivity.

Thus, a diversity reception antenna in accordance with the present invention which is composed of high-frequency pickups for detecting high-frequency surface currents which flow concentratedly on the peripheral edge portion of the roof panel at the rear portion of the vehicle body and high-frequency pickups which are disposed at the front portion of the vehicle body greatly improves the directional characteristics of an antenna.

Second Embodiment

A second embodiment will be explained hereinunder. This embodiment is characterized in that the diversity antenna system is composed of high-frequency pickups which are longitudinally disposed on the edge molding retainers, at predetermined positions of the engine hood at the front portion of the vehicle body and the trunk lid at the rear portion of the vehicle body, respectively, in close proximity thereto FIG. 10 shows the arrangement of the four high-frequency pickups 238 - to 238 - 4 which constitute a diversity system. They are disposed on the edge molding retainers, and at predetermined positions of the engine hood at the front portion of the vehicle body and the trunk lid at the rear portion of the vehicle body.

The structure of the high-frequency pickups 238 - 1 and 238 - 2 which are disposed in the vicinity of the marginal edge portions on the rear window glass side is similar to that shown in the first embodiment shown in FIGS. 2 and 3, explanation thereof being omitted.

Figure 11:
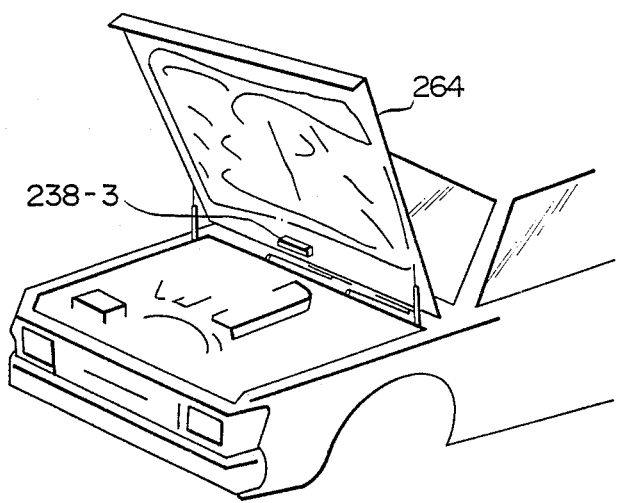
FIG. 11 is a perspective view of the second embodiment, showing the state in which a high-frequency pickup incorporated in the diversity antenna system is mounted on the engine hood at the front portion of the vehicle body.
Figure 12:
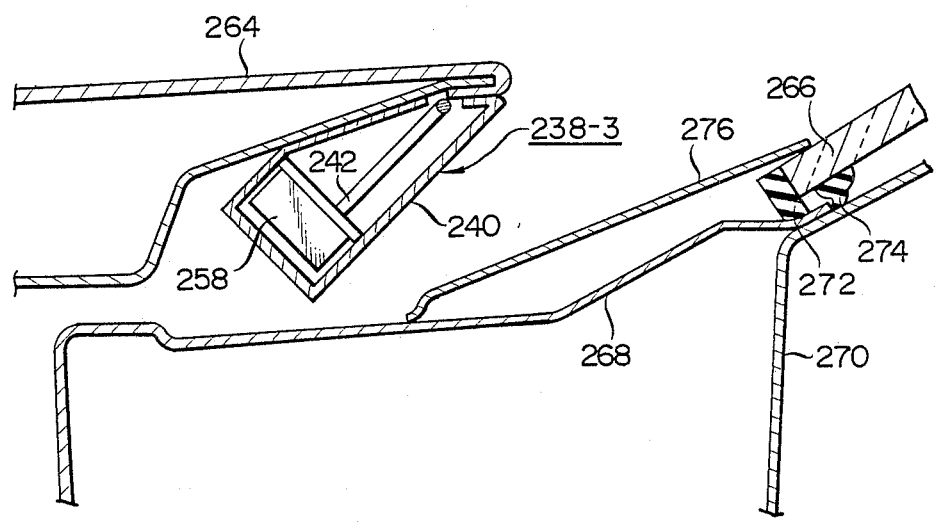
FIG. 12 is a cross sectional view of the pickup shown in FIG. 11, showing the attachment structure of the main part thereof.

The structure of the high-frequency pickup which is disposed on the engine hood is schematically shown in FIG. 11, and FIG. 12 is a cross sectional view thereof.

In FIGS. 11 and 12, an engine hood 264 is rotatably supported by the vehicle body at one end thereof, and in its closed state, the inner surface of the peripheral edge portion which faces the front windshield glass 266 is opposed to a front outer panel 268. The inside of the front outer panel 268 is connected to a front inner panel 270 and the front windshield glass 266 is supported on the front outer panel 268 by a stopper 272 A dam 274 is provided between the front windshield glass 266 and the front inner panel 270, thereby preventing the ingress of rainwater or the like.

At the lower end of the front windshield glass 266, a molding 276 is provided, as is known.

In this embodiment, the high-frequency pickup 238 - 1 is fixed at the middle portion of the end of the engine hood 264 which faces the interior of the vehicle body and the front outer panel 268, in particular, within a distance of 4.5 cm inwardly of the peripheral edge of the engine hood. This arrangement enables the high-frequency currents which concentratedly flow with high density on the peripheral portion of the engine hood to be stably detected in a state of low noise.

A high-frequency pickup 238 - 3 also has a similar structure to that of the high-frequency pickups 38 - 1 and 38 - 2 which are disposed in the vicinity of the rear window glass in the first embodiment. It includes a casing 240, a loop coil 242 and a circuitry 258.

Figure 13:
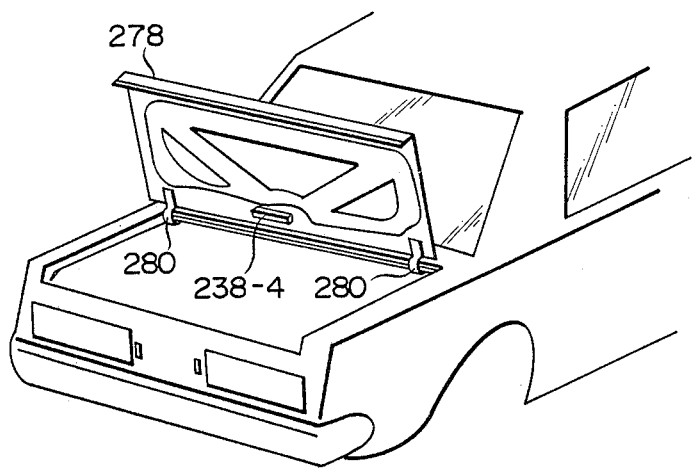
FIG. 13 is a perspective view of the second embodiment showing the state in which a high-frequency pickup incorporated in the diversity antenna system is mounted on the trunk lid at the rear portion of the vehicle body.
Figure 14:
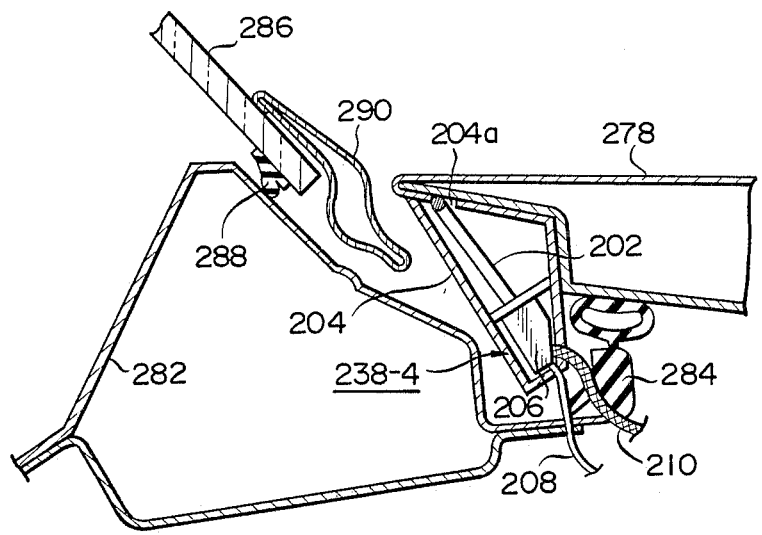
FIG. 14 is a cross sectional view of the pickup shown in FIG. 13, explaining the attachment structure of the main part thereof.

FIG. 13 schematically shows the structure of the high-frequency pickup 238 - 4 which is disposed on a trunk lid 278, and FIG. 14 is a cross sectional view thereof.

One end of the trunk lid 278 is rotatably supported by the vehicle body through a trunk hinge 280.

In FIG. 14, a water sealing weather strip 284 is provided between the trunk lid 278 and the rear tray panel 282 so as to prevent the ingress of rainwater or the like from the rear window glass 286.

A dam 288 provided between the rear window glass 286 and the rear tray panel 282 maintains airtightness, prevents the ingress of rainwater, sound or the like, and a molding 290 is provided at the lower end of the rear window glass 286 on the external side, as is known.

In this embodiment, the high-frequency pickup 238 - 4 is fixed at the middle portion of the trunk lid 278 which faces the interior and on the surface which faces the rear tray panel 282, and a loop antenna 202 provided within the high-frequency pickup 238 - 4 is disposed such that the longitudinal direction thereof agrees with the longitudinal direction of the trunk lid 278.

In this way, since the high-frequency pickup 238 - 4 is disposed at the middle portion of the trunk lid 278, the loop antenna 202 can detect surface currents with low noise.

Furthermore, since the loop antenna 202 is disposed within a distance of $12 \times 10^{-3} c/f(m)$, namely, 4.5 cm inward of the peripheral edge of the trunk lid 278 in the case of receiving FM broadcast waves, the loop antenna 202 can stably and very efficiently catch the surface currents which flow concentratedly on the peripheral edge portion of the trunk lid 278.

The high-frequency pickup 238 - 4 includes a casing 204 consisting of a conductive material, and the circuitry 206 including a loop coil 202 and a pre-amplifier is accommodated in the casing 204. The opening 204a of the casing 204 is opposed to the trunk lid 278.

To the circuitry 206, power source and a signal for controlling the circuit is supplied from a cable 208 and a high-frequency detection signal fetched by the loop coil 202 is externally taken out of a coaxial cable 210.

Since surface currents flow along the marginal edge portions of the vehicle body, as is clear from FIG. 38, the loop antenna 202 in this embodiment is longitudinally disposed along the peripheral edge of the trunk lid 278.

In this manner, since surface currents are detected from the inside of the trunk lid by the high-frequency pickup, positive reception in the high-frequency bands is ensured without any external exposure of the high-frequency pickup. Thus this pickup is very useful as an automobile TV antenna.

Figure 15:
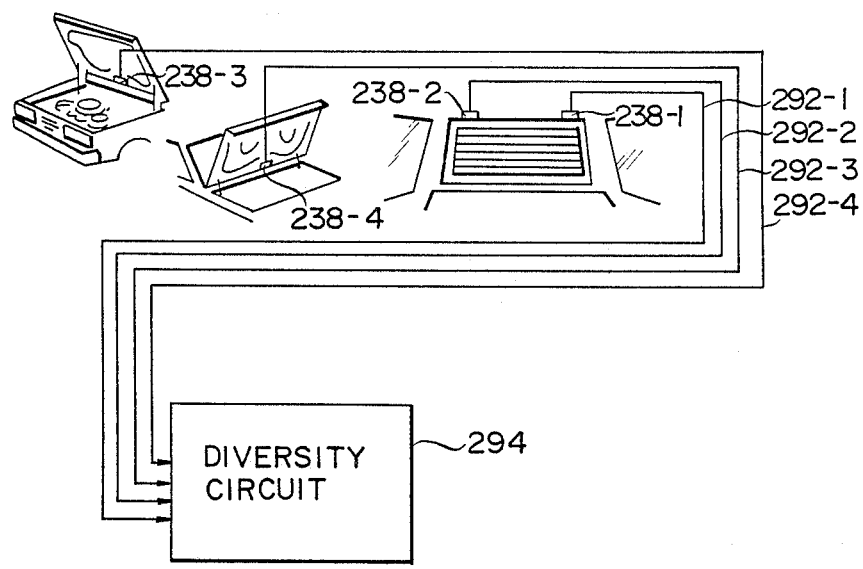
FIG. 15 is a block diagram for diversity controlling in the second embodiment.

The structure of the circuit in which broadcast waves are received by the pickup enjoying the best reception which is automatically selected from among the pickups 238 - 1 to 238 - 4 will now be explained with reference to FIG. 15.

Figure 7:
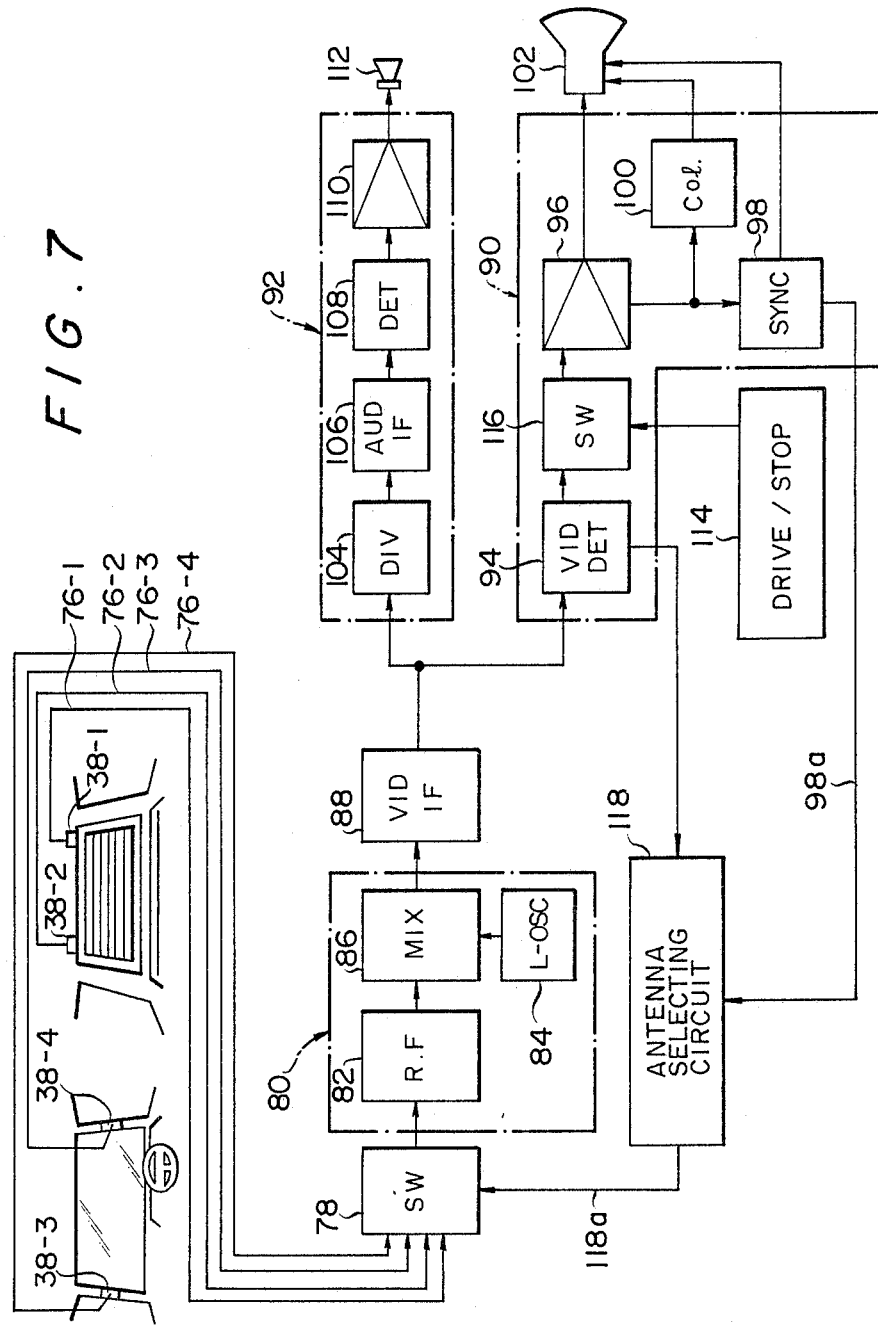
FIG. 7 is a block diagram for diversity controlling in the first embodiment.

Two TV antennas each of which consists of a high-frequency pickup 238 - 1, 238 - 2, 238 - 3, or 238 - 4, are provided both on the front pillars and on the roof panel on the rear portion of the vehicle body, and the receiving signals of these four high-frequency pickups are supplied to a diversity circuit 294 similar to that in the first embodiment shown in FIG. 7 by coaxial cables 292 - 1 to 292 - 4, and are processed in a similar way.

In order to obtain a good picture and sound by means of such a diversity circuit even when the receiving state of the antenna changes during the travel of the vehicle, a diversity reception system is adopted in which the receiving operation is taken over, in correspondence with a change in the receiving state of waves, by the optimum pickup among the pickups 38 - 1 to 38 - 4 which enjoys the best reception by automatic change-over.

FIGS. 16A and 16B illustrate the directional patterns of antennas in the TV broadcast frequency band. In FIG. 16A, a high-frequency pickup is mounted on the engine hood at the front portion of the vehicle body, and in FIG. 16B, a high-frequency pickup is mounted on the trunk lid at the rear portion of the vehicle body.

The directional patterns of the antennas which are mounted on the front and rear portions of the vehicle body, respectively, are approximate to the configuration of numeral 8, as is clear from the characteristic curves 212 and 214 in FIGS. 16A and 16B, and no sudden drop of output level (dipping point) is seen.

As described above, according to this embodiment, the best possible reception of TV waves is enabled by the diversity reception using a plurality of high-frequency pickups and thereby compensating together for any degeneration of sensitivity.

Thus, a diversity reception antenna in accordance with the present invention which is composed of high-frequency pickups for detecting high-frequency surface currents which concentratedly flow on the peripheral edge portion of the roof panel at the rear portion of the vehicle body and high-frequency pickups which are disposed on the engine hood at the front portion of the vehicle body and on the trunk lid at the rear portion thereof greatly improve the directional characteristics of an antenna, and thereby enhances the receiving performance.

Third Embodiment

In a third embodiment of the present invention, high-frequency pickups are longitudinally disposed on the front pillars and on the center pillars on both sides of the vehicle body.

Figure 17:
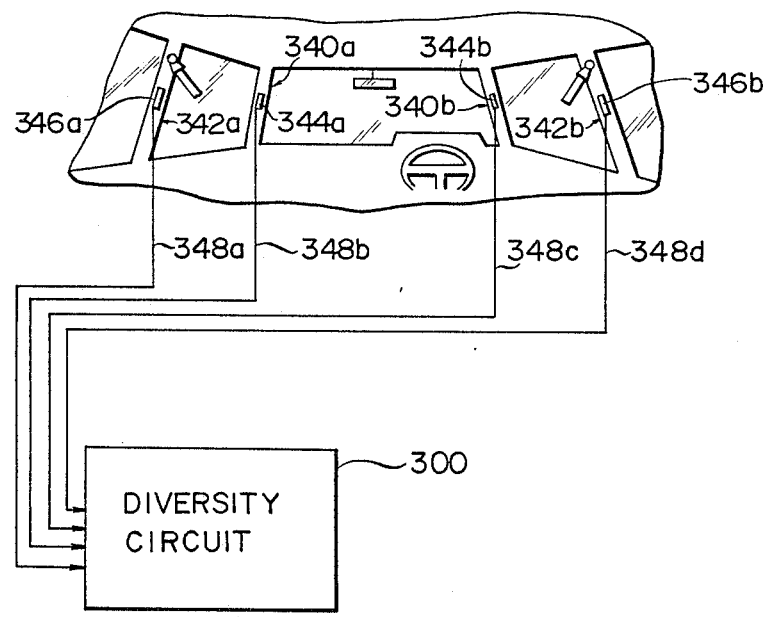
FIG. 17 is a block diagram illustrating the schematic structure of a third embodiment of an automobile TV antenna system according to the present invention.

FIG. 17 shows an antenna system in accordance with this embodiment.

This embodiment is characterized in that high-frequency pickups 344a, 344b, 346a and 346b having a similar structure to that of the above-described probe are disposed on front pillars 342a and 342b and center pillars 346a and 346b, these four pickups 344a, 344b, 346a, 346b constituting a space diversity antenna.

It is known that antennas for a space diversity reception system can ordinarily obtain space diversity effects which are adequate for practical use if the distance between them is more than $\lambda/4$ to $\lambda/2$, wherein $\lambda$ represents wavelength. It will be understood that since the distance between the high-frequency pickups 344a and 344b placed on the front pillars on both sides is about 1.5 m, and the distance between the high-frequency pickups 344 and 346 placed on the front pillar and the center pillar, respectively, is about 0.8 m, and the wavelength of the TV broadcast waves is about 3.5 m or less, this embodiment provides a very effective space diversity reception antenna system for such TV broadcast frequency band.

The structure of the circuit in which broadcast waves are received by the pickup enjoying the best reception which is automatically selected from among the pickups 344a, 344b 346a and 346b will now be explained with reference to FIG. 17.

The receiving signals of these high-frequency pickups 344 and 346 are supplied to a diversity circuit 300 by coaxial cables 348a, 348b, 348p and 348d.

Since the diversity circuit 300 is similar to that in the first embodiment shown in FIG. 7, explanation thereof will be omitted.

FIGS. 18A and 18B illustrate the directional patterns of antennas in the TV broadcast frequency band. In FIG. 18A, a high-frequency pickup is mounted on the righthand pillar and in FIG. 18B, a high-frequency pickup is mounted on the righthand center pillar.

The directional pattern of the antennas which are mounted on the front pillars is approximate to the configuration of the numeral 8, as is clear from the characteristic curve in FIG. 18A, and no sudden drop of output level (dipping point) is seen.

The high-frequency pickup 346b which is mounted on center pillar produces the directional characteristic which is indicated by the characteristic curve shown in FIG. 18b.

Therefore, it is possible to compensate for each other in terms of the sensitivity characteristic by providing the high-frequency pickups on the right and left front pillars and center pillars.

As described above, according to this embodiment, the four high-frequency pickups in combination which are provided on the front pillars and center pillars on both sides of the vehicle body enable diversity reception by compensating together for any degeneration of sensitivity and thereby the best TV broadcast reception is effected.

An example of attachment of the high-frequency pickups to the front pillar and the center pillar will here be explained with reference to FIGS. 19 to 21.

Figure 19:
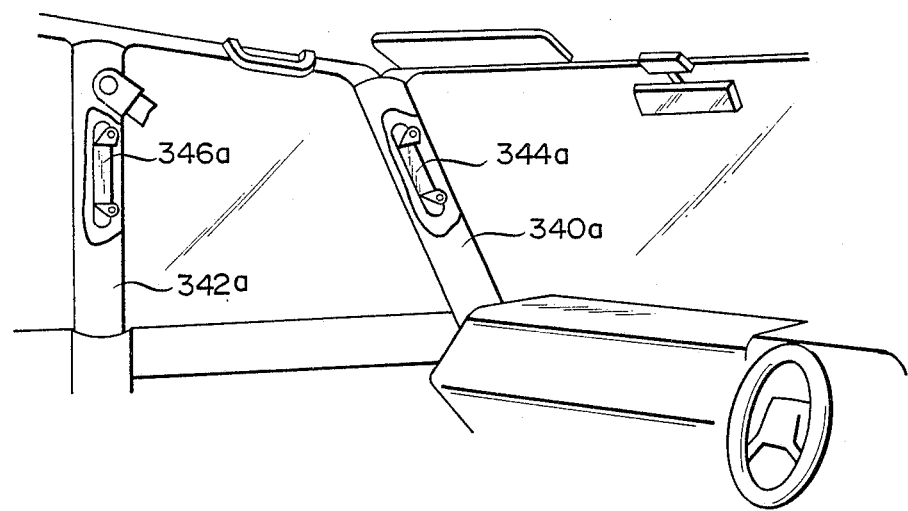
FIG. 19 is an explanatory view of the schematic arrangement of the high-frequency pickups in the third embodiment.

FIG. 19 schematically illustrates the structure of an antenna system in accordance with this embodiment. The high-frequency pickups 344a and 346b are accommodated in the front pillar 340a and the center pillar 342a respectively. In the embodiment, these high-frequency pickups 344a and 346a respectively consist of electromagnetic type pickups.

The high-frequency pickup 344a provided on the front pillar 340a will be explained with reference to FIG. 20. The sectional view of the pickup in the first embodiment in FIG. 6 is also applicable to this embodiment.

Figure 20:
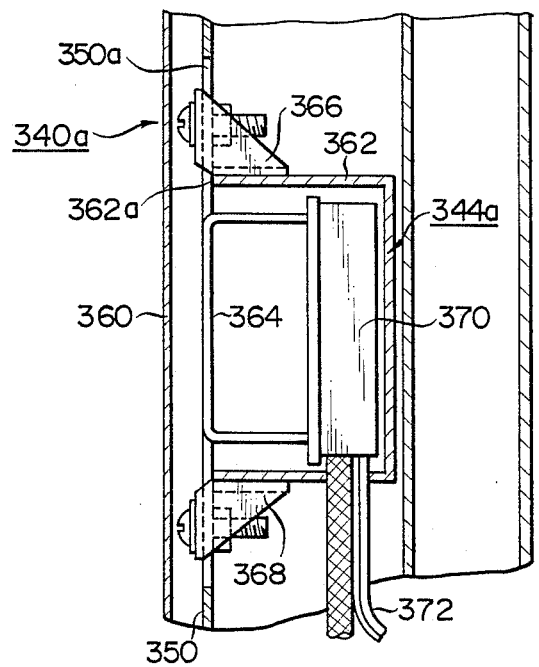
FIG. 20 is a partially sectional view of the electromagnetic coupling type high-frequency pickup in the third embodiment which is mounted on the front pillar.

The high-frequency pickup 344a is composed of a casing 362 of a conductive material and a loop coil 364 which constitutes an antenna element provided therewithin, as is obvious from FIG. 20. The casing 362 for shielding the loop antenna from an external electromagnetic field is provided with an opening 362a at one side thereof. The loop coil 364 is exposed from the opening 362a and is disposed in proximity to the pillar pedestal 350 on which high-frequency surface currents flow concentratedly.

In order to insert the high-frequency pickup 344a into the hollow prism of the pillar pedestal 350, an opening 350a is provided on a part of the pillar pedestal 350. The high-frequency pickup 344a is inserted into the pillar before the front garnish 360 is fixed. In order to secure the casing 362 of the high-frequency pickup 344a to the pedestal plate 350, brackets 366 and 368 are fixed to both sides of the casing 362 by spot welding or the like, and the brackets 366 and 368 are tightly screwed to the pedestal plate 350.

Accordingly, the loop coil 364 in this fixed state is disposed in the vicinity of the opening portion 350a of the pedestal plate 350, whereby the magnetic flux induced by the surface currents which flow concentratedly on the pedestal plate 350 effectively intersect the loop coil 364.

A circuitry 370 including a pre-amplifier and the like is housed behind the loop coil 364 in the casing 362. Power source and a signal for controlling the circuit is supplied from a cable 372 to the circuitry 370, and the high-frequency detection signal fetched by the loop coil 364 is fetched to the outside from a coaxial cable 48 and is processed by a circuit similar to that used for examining distribution of surface currents.

The loop coil 364 is in the from of a single wound coil which is covered with an insulation such that the coil can be arranged in an electrically insulated relationship with and in close contact with the peripheral edge portion of the pillar pedestal plate 350 in a preferred structure. Thus, the magnetic flux induced by the surface currents concentratedly flowing on the pedestal plate 350 can intersect the loop coil 364 with good efficiency.

After the high frequency pickup 344a is inserted into the front pillar 340a in this way, the front pillar 340a is covered with the front pillar garnish 360. Thus, the structure of the front pillar 340a is perfectly the same as an ordinary pillar in terms of external appearance.

As a result, the high-frequency surface currents which are concentrated and flow on the front pillar are detected with good efficiency by the loop coil which is longitudinally provided there, thereby ensuring reception in the high-frequency bands without any external exposure of the antenna system.

Figure 21:
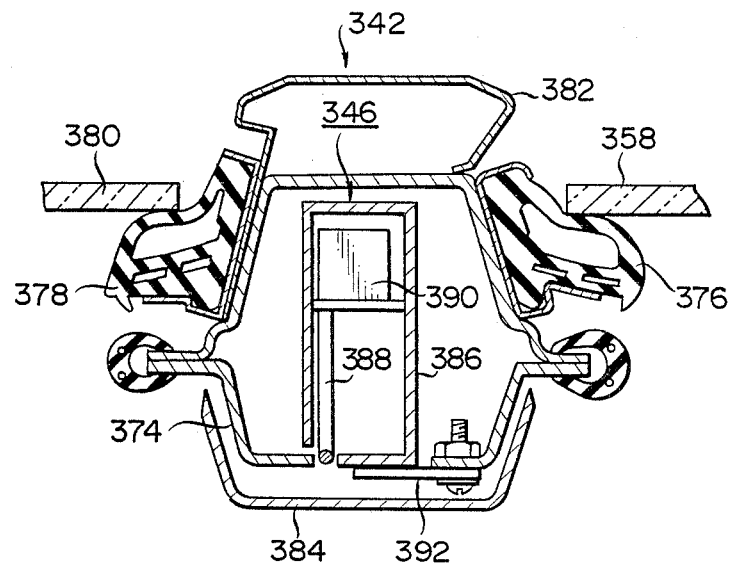
FIG. 21 is a cross sectional view of the electromagnetic coupling type high-frequency pickup in the third embodiment which is mounted on the center pillar.

FIG. 21 shows the high-frequency pickup 346 which is mounted on the center pillar 342.

The center pillar 342 as well as the front pillar 340 has a pedestal plate 374 in the form of a hollow prism which serves as the main pillar, and weather strips 376 and 378 which are secured to the side surfaces of the pedestal plate 374 for water sealing between a front side window glass 358 and a rear side window glass 358. A front pillar molding 382 is secured to the pedestal plate 374 on the surface which faces the exterior of the vehicle body, and the other surface which faces the interior is covered with a center pillar garnish 384.

The high-frequency pickup 346 is also an electromagnetic coupling type pickup having a similar structure to that disposed on the front pillar. It includes a casing 386, a loop coil 388 and a circuitry 390. A bracket 392 which is fixed to the casing 386 by spot welding is screwed to the peripheral edge portion of an opening provided on the pedestal plate 374.

The high-frequency pickup 346 is also inserted from the opening of the pedestal plate 374 into the main pillar and the loop coil 388 in this fixed state is disposed in proximity to the peripheral edge of the pillar plate 373.

In this way, the loop coil provided on the center pillar can also collect with high efficiency the surface currents in the high-frequency bands which flow concentratedly on the center pillar. Thus, the built-in antenna which does not project outwardly can perform a receiving operation with high efficiency.

Although an electromagnetic coupling type pickup is used as the high-frequency pickup in this embodiment, since this embodiment is characterized by detection of the surface currents on the pillars for reception of external waves, an electrostatic coupling type pickup is also usable as the high frequency pickup as well as the electromagnetic type pickup.

When an electrostatic coupling type pickup is used, a detection electrode is longitudinally disposed on the pillars in FIGS. 19 to 21 through an air layer or an insulation layer, and a high-frequency signal is fetched to the detection electrode side through the electrostatic capacity formed between the surface of the pillars, thereby making it possible to fetch a high-frequency signal in a desired band.

As described above, the diversity reception antenna system in accordance with this embodiment, which is composed of high-frequency pickups for detecting the high-frequency surface currents which concentratedly flow on the front pillars and center pillars, can greatly improve the directional characteristics of an antenna without impairing the external aesthetic appearance.

Fourth Embodiment

Figure 22:
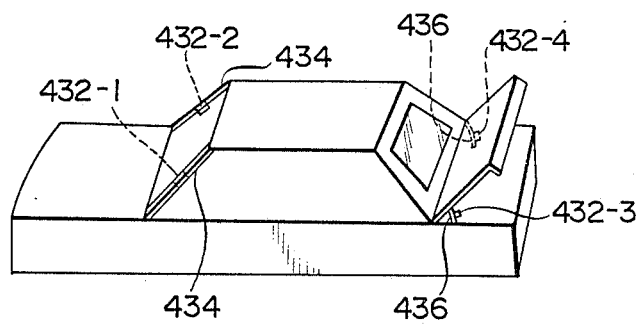
FIG. 22 shows the entire part of a fourth embodiment of an automobile TV antenna system according to the present invention, showing the arrangement of the high-frequency pickups.

An antenna system according to a fourth embodiment of the present invention is shown in FIG. 22.

Four high-frequency pickups 432 - 1 to 432 - 4 which constitute the diversity antenna are provided on the front pillar 434s and the trunk hinges 436.

The high-frequency pickups 432 are provided longitudinally on the front pillars 434 and the trunk hinges 436, respectively, in close proximity thereto to efficiently pick up the surface currents which flow concentratedly on the marginal edge portions of the vehicle body.

Since the high-frequency pickup 432 which is disposed on the front pillar 434 has a similar structure to that in the first embodiment shown in FIGS. 5 and 6, explanation thereof will be omitted.

Figure 23:
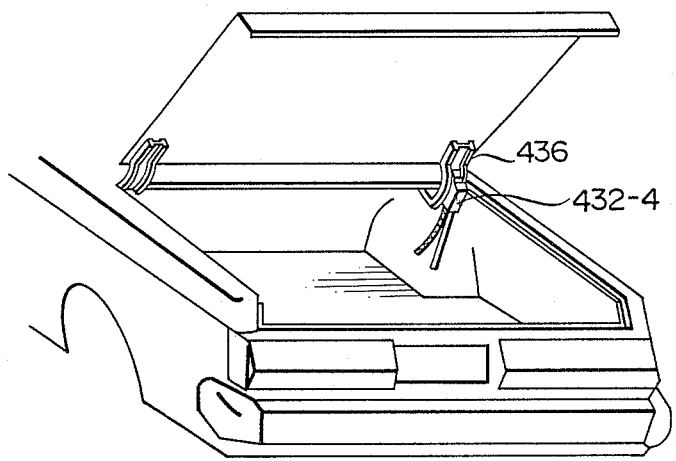
FIG. 23 is a schematic perspective view of the trunk hinges on which high-frequency pickups incorporated in the diversity antenna in the fourth embodiment is mounted.
Figure 24:
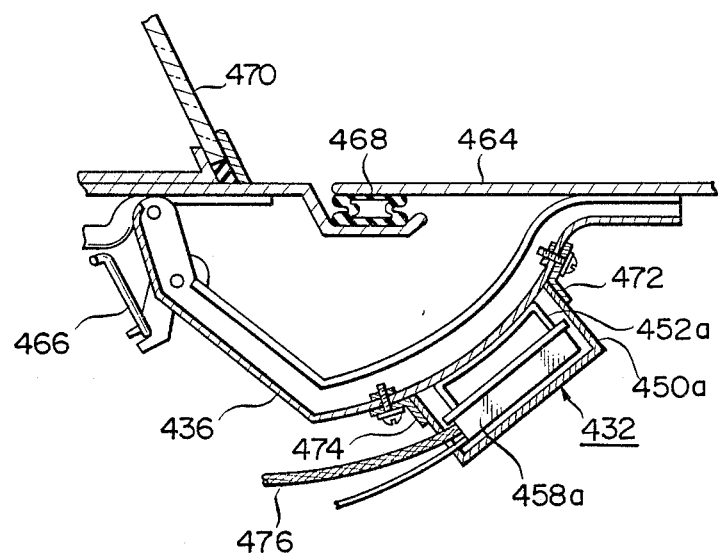
FIG. 24 is a partially sectional view of the pickup shown in FIG. 23, explaining the attachment structure of the main part thereof.

FIG. 23 shows an example of attachment in which the high-frequency pickup 432 in this embodiment is secured to the trunk hinge 436, and FIG. 24 shows it in detail.

The trunk hinge 436 with one end thereof rotatably supported by the vehicle body and the other end secured to the trunk lid 464 rotatably supports the trunk lid 464.

A torsion bar 466 provided on the end of the trunk hinge 436 which is rotatably supported by the vehicle body controls the opening degree of the trunk lid 464 when it is open.

As is known a water sealing weather strip 468 is provided between the trunk lid 464 and the vehicle body, thereby preventing rainwater from entering from the rear window glass 470.

In this embodiment, the high-frequency pickup 432 is longitudinally fixed on the outer surface of the trunk hinge 436, namely, on the side facing the trunk void, in such a manner that the longitudinal side of a lop antenna 452a provided within the high-frequency pickup 432 is disposed in parallel to the longitudinal side of the trunk hinge 436. In this way, the loop antenna 452a in this embodiment can positively catch the surface currents flowing on the trunk hinge 436 with high efficiency.

The high-frequency pickup 432 - 3 includes a casing 450a formed of a conductive material. The casing 450a is provided with the loop antenna 452a and a circuitry 458a containing a pre-amplifier and the like therewithin, and the opening side of the casing 450a is opposed to the trunk hinge 436.

L-shaped brackets 472, 474 are secured to both open end portions of the casing 450a, and one end of each of the L-shaped brackets 472, 474 is firmly screwed to the trunk hinge 436. Therefore, it will be understood that the magnetic flux alone which is induced by the high-frequency surface currents flowing on the trunk hinge 436 is introduced into the casing 450a, and safely shielded from external magnetic flux by the casing 450a.

The structure of the circuit in which broadcast waves are received by the pickup enjoying the best reception which is automatically selected from among the pickups 432 - 1 to 432 - 4 will now be explained with reference to FIG. 25

Two TV antennas each of which consists of a high-frequency pickup 432 - 1, 432 - 2, 432 - 3, or 432 - 4, are provided on the front pillars and on the trunk lids at the rear portion of the vehicle body, and the receiving signals of these four high-frequency pickups 432 are input to a diversity circuit 400 by coaxial cables 476 - 1 to 476 - 4.

The diversity circuit 400 is similar to the circuit in the first embodiment shown in FIG. 7, explanation thereof being omitted.

FIGS. 26A and 26B illustrate the directional patterns of antennas in the TV broadcast frequency band. In FIG. 26A, a high-frequency pickup is mounted on the front pillar, and in FIG. 26B, a high-frequency pickup is mounted on the trunk hinge.

As is obvious from the characteristic curves 410 and 412, the high-frequency pickup mounted on the front pillar exhibits high sensitivity in the transverse direction of the vehicle body, while the high-frequency pickup mounted on the trunk hinge exhibits high sensitivity in the longitudinal direction of the vehicle body. Therefore these pickups in combination can compensate for any degeneration of the sensitivity, thereby enabling the best possible TV broadcast reception.

Thus, a diversity reception antenna in accordance with the present invention, which is composed of high-frequency pickups which are longitudinally disposed on the front pillars and the trunk hinges in proximity thereto for detecting the high-frequency surface currents which flow concentratedly on the marginal edge portions of the vehicle body, can greatly improve the directional characteristics of an antenna, reduce the multipath noise, and thereby enhance the receiving performance.

Fifth Embodiment

FIG. 27 shows a fifth embodiment of an antenna system according to the present invention.

This embodiment is characterized in that a space diversity antenna system is composed of high-frequency pickups 544a, 544b 546a and 546b which are longitudinally disposed on an engine hood 540 on both sides of the vehicle body and at peripheral edge portions of the a trunk lid 542 on both sides of the vehicle body. Each of the high-frequency pickups has a similar structure to that of the probe described above.

It is known that antennas for a space diversity reception system can ordinarily obtain space diversity effects which are adequate for practical use if the distance between them is more than $\lambda/4$ to $\lambda/2$, wherein $\lambda$ represents wavelength. It will be understood that since the distance between the high-frequency pickups 544a and 544b, and between the high-frequency pickups 546a and 546b placed on the right and left peripheral edge portions of the engine hood 540 and the trunk lid 542, respectively, is about 1.5 m, the distance between the high-frequency pickup 544 placed on the engine hood 540 and the high-frequency pickup 546 placed on the trunk lid 542 is about 2 m, and the wavelength of the TV broadcast waves is about 3.5 m or less, this embodiment provides a very effective space diversity reception antenna system for such TV broadcast frequency band.

The structure of the circuit in which broadcast waves are received by the pickup enjoying the best reception which is automatically selected from among the pickups 544a, 544b, 546a and 546b will now be explained with reference to FIG. 27.

The receiving signals of these high-frequency pickups 544 and 546 are supplied to a diversity circuit 500 by coaxial cables 548a, 548b, 548c and 548d.

Since the diversity circuit 500 is similar to that in the first embodiment shown in FIG. 7, explanation thereof will be omitted.

FIGS. 28A and 28B illustrate the directional patterns of antennas in the TV broadcast frequency band. In FIG. 28A, a high-frequency pickup is mounted on the right end portion of the rear edge of the engine hood, and in FIG. 28B, a high-frequency pickup is mounted on the right end portion of the front edge of the trunk lid.

The directional pattern of the antenna 544a which is mounted on the right end portion of the rear edge of the engine hood is approximate to the configuration of the numeral 8, as is clear from the characteristic curve in FIG. 28A. and has good sensitivity in the forward direction.

The high-frequency pickup 546b which is mounted on the right end portion of the front edge of the trunk lid produces the directional characteristic of a substantially 8-shaped pattern, as shown in FIG. 28B, having good sensitivity in the backward of the vehicle body.

The directional characteristics of the high-frequency pickups provided at the symmetrical position on the right and left sides of the engine hood and the trunk lid are not completely the same. Therefore, it is possible to compensate for each other in terms of the sensitivity characteristic by providing the high-frequency pickups on the right and left marginal portions of the engine hood and the trunk lid.

As described above, according to this embodiment, the four high-frequency pickups which are provided on the right and left marginal portions of the engine hood and the trunk lid enable diversity reception by compensating together for any degeneration of sensitivity and thereby the best possible TV broadcast reception is enabled at any time.

In this embodiment, attachment of the high-frequency pickups to the trunk lid is similar to that in the second embodiment shown in FIG. 14, and therefore explanation thereof will be omitted.

Figure 29:
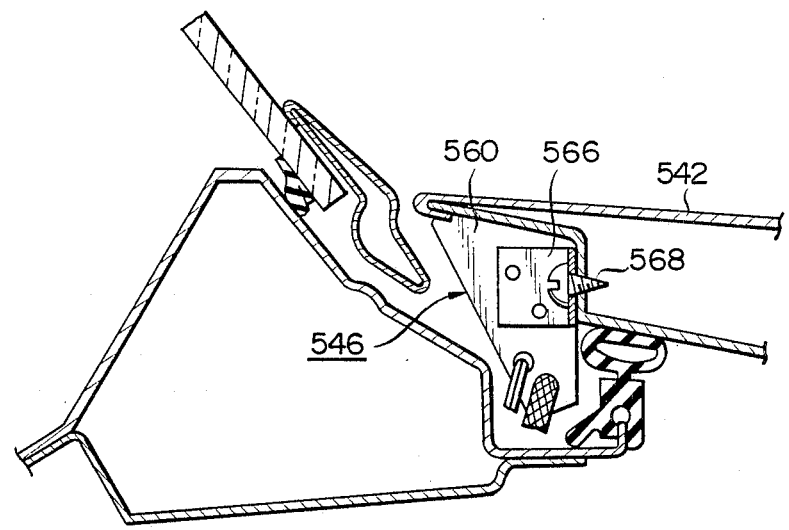
FIGS. 29 and 30, respectively, are a sectional view and a plan view of the high-frequency pickup in the fifth embodiment which is mounted on the trunk lid.

FIG. 29 shows another example of attachment of the high-frequency pickup 546 to the trunk lid 542.

In the drawing, a fitting metal 566 is attached to both side surfaces of the casing 560 of the high-frequency pickup 546 by bolting or the like. The high-frequency pickup 546 is firmly secured to the inside of the trunk lid 542 by fixing the fitting metals 566 and the inner panel of the trunk lid 542 by screws 568.

Figure 30:
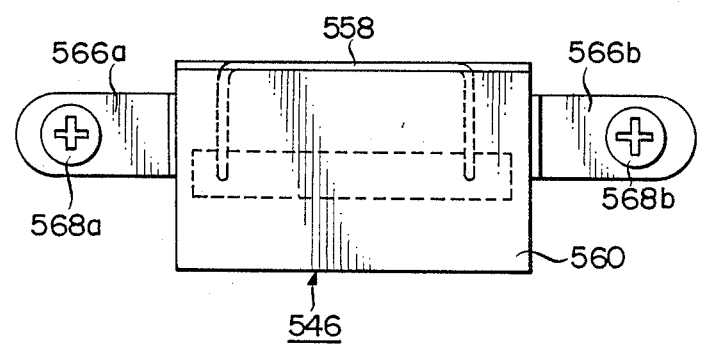

Therefore it is preferable that the high-frequency pickup 546 has the structure shown in FIG. 30. The referential numeral 558 denotes a loop coil.

Figure 31:
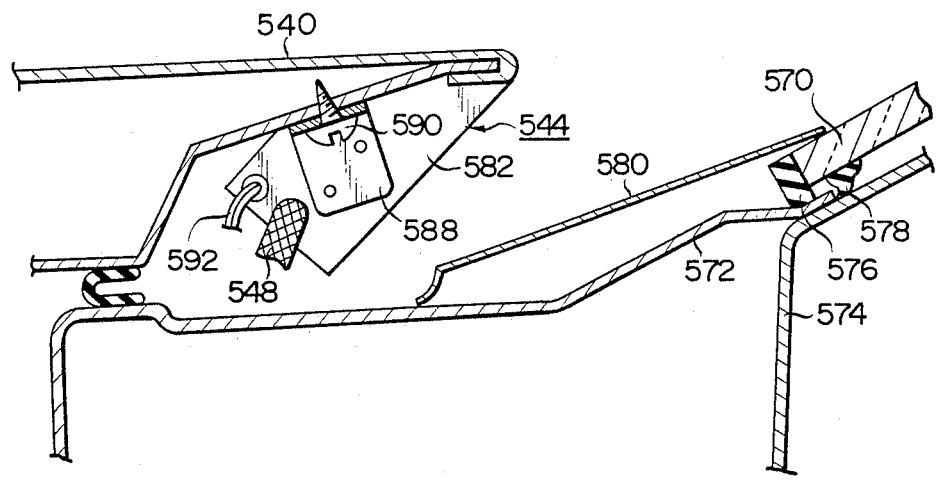
FIGS. 31 and 32 are a sectional view and a plan view, respectively, of the high-frequency pickup in the fifth embodiment which is mounted on the engine hood.
Figure 32:
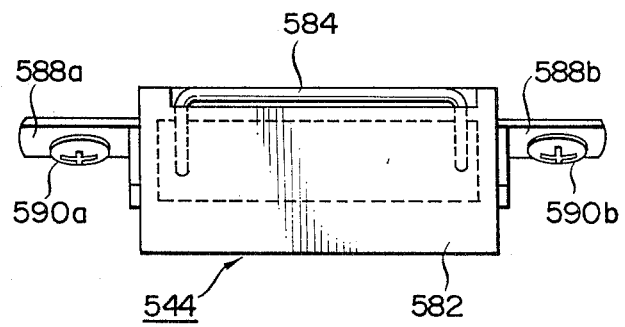

FIG. 31 illustrates attachment of the high-frequency pickup 544 to the engine hood 540, and FIG. 32 is an external view of the high-frequency pickup to be attached to the engine hood. In a substantially similar way as in the attachment to the trunk lid, the high-frequency pickup 544 is secured to the engine hood by fitting metals 588 and screws 590. Power source for controlling the circuit and signals is supplied from cables 592 and are fetched by coaxial cable 548. The referential numeral 582 represents a pickup casing, and 584 a loop antenna.

Incidentally, it is necessary to select the locations of the high-frequency pickups in this embodiment so as not to obstruct the accommodation of a wiper blade.

In FIG. 31, one end of the engine hood 540 is rotatably supported by the vehicle body, and the inner surface of the peripheral edge portion facing the front windshield glass 570 is opposed, in its closed state, to a front outer panel 572.

The inside of the front outer panel 572 is connected to a front inner panel 574, and the front windshield glass 570 is supported on the front outer panel 572 by a stopper 576. A dam 578 is provided between the front windshield glass 570 and the front inner panel 574, thereby preventing the ingress of rainwater or the like.

At the lower end of the front windshield glass 570, a molding 580 is provided, as is known.

It is also possible in this embodiment to adopt the example of attachment of the pickup to the engine hood in the second embodiment shown in FIG. 12.

Although an electromagnetic coupling type pickup is used as the high-frequency pickup in this embodiment, since this embodiment is characterized by detection of the surface currents on the engine hood and the trunk lid for reception of external waves, an electrostatic coupling type pickup is also usable as the high frequency pickup as well as the electromagnetic type pickup.

When an electrostatic coupling type pickup is used, a detection electrode is longitudinally disposed on the engine hood or the trunk lid in FIG. 29 or 31 through an air layer or an insulation layer, and a high-frequency signal is fetched to the detection electrode side through the electrostatic capacity formed between the surface of the engine hood or the trunk lid, thereby making it possible to fetch a high-frequency signal in a desired band.

As described above, the diversity reception antenna system in accordance with this embodiment, which is composed of high-frequency pickups for detecting the high-frequency surface currents which concentratedly flow on the peripheral edge portions of the engine hood and the trunk lid, can greatly improve the directional characteristics of an antenna without impairing the external aesthetic appearance.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An automobile TV antenna system comprising: pickup means
   a plurality of high-frequency disposed on a vehicle body at a plurality of positions spaced from each other in a concealed state without any external exposure; and
   diversity circuit means for automatically selecting from among said plurality of pickups the pickup that exhibits the optimum reception at any give time;
   each of said high-frequency pickup means including:
   an antenna disposed in close proximity to a marginal edge portion of said vehicle body in order to pick up the high-frequency surface currents which flow concentratedly on said marginal edge portion of said vehicle body; and a casing having an opening through which said antenna is disposed in close proximity to the marginal edge portion of the vehicle body.

2. An automobile TV antenna system according to claim 1, at least one of said plurality of high-frequency pickup means being disposed in the vicinity of a retainer on which an edge molding for a window frame (hereinunder referred to as "edge molding retainer") is mounted for a window frame, and others of said plurality of high-frequency pickup means being accommodated in the window pillars on the opposite sides of said window frame, respectively.

3. An automobile antenna system according to claim 2, each of said plurality of high-frequency pickup means having a loop antenna disposed in proximity to said marginal edge portion of said vehicle body and being opposed to another loop antenna.

4. An automobile antenna system according to claim 3, said edge molding retainer having a substantially horizontal surface and a length which facilitates the resonance of the surface currents flowing on the marginal edge portion of said vehicle body with respect to the frequency of 50 MHz or more being longitudinally disposed apart from a rear window frame by a distance of about $2 \times 10^{-3}x$ wavelength, thereby enhancing the degree of concentration of said currents flowing on the marginal edge portion of said vehicle body;
   a first loop antenna of one of said plurality of high-frequency pickup means being longitudinally disposed in proximity to the peripheral edge of said edge molding retainer; and
   a second loop antenna of another one of said plurality of high-frequency pickup means being disposed in pillar at the front portion of said vehicle body which has an adequately large angle of elevation with respect to said vehicle body in comparison with said edge molding retainer.

5. An automobile antenna system according to claim 4, said plurality of high-frequency pickup means comprising four high-frequency pickup means disposed in the vicinity of the right and left peripheral edge portions of said rear window frame which faces a rear window glass and at the positions of the right and left front pillars, respectively.

6. An automobile antenna system according to claim 1,
   at least one of said plurality of high-frequency pickup means being disposed in the vicinity of an edge molding retainer;
   another of said plurality of high-frequency pickup means being provided on an engine hood; and
   still another of said plurality of high-frequency pickup means being provided on a trunk lid.

7. An automobile antenna system according to claim 6,
   said edge molding retainer having a length which facilitates the resonance of the surface currents flowing on the marginal edge portion of said vehicle body with respect to the frequency of 50 MHz or more being disposed apart from a rear window frame by a distance of about $2 \times 10^{-3}x$ wavelength; and means including a loop
   each of said plurality of high-frequency pickup antenna longitudinally provided at the respective predetermined position in proximity to said edge molding retainer, said engine hood or said trunk lid.

8. An automobile antenna system according to claim 7, said plurality of high-frequency pickup means comprising four high-frequency pickup means respectively disposed at the right and left positions in the vicinity of the right and left peripheral edge portions of a rear window frame which faces a rear window glass, and in the center parts of said engine hood and said trunk lid which face the interior of said vehicle body.

9. An automobile antenna system according to claim 1, said plurality of high-frequency pickup means being accommodated respectively in a front pillar and a center pillar.

10. An automobile antenna system according to claim 9, said plurality of high-frequency pickup means comprising four high-frequency pickup means longitudinally disposed respectively in said front pillar and said center pillar.

11. An automobile antenna system according to claim 1, said plurality of high-frequency pickup means being accommodated in a front pillar and a trunk hinge, respectively.

12. An automobile antenna system according to claim 11, said plurality of high-frequency pickup means incorporating four high-frequency pickup means each having a loop antenna longitudinally disposed in proximity to the right and left front pillars and the right and left trunk hinges, respectively.

13. An automobile antenna system according to claim 1, said plurality of high-frequency pickup means being accommodated in an engine hood and a trunk lid, respectively.

14. An automobile antenna system according to claim 13, said plurality of high-frequency pickup means comprising at least four high-frequency pickup means longitudinally disposed in proximity to the right and left peripheral edge portions of said engine hood and said trunk lid, respectively.

15. An automobile antenna system according to claim 14, said plurality of high-frequency pickup means being provided within a distance of $12 \times 10^{-3}$ c/f(m) inward of the peripheral edge of said engine hood and said trunk lid, respectively.

16. An automobile antenna system according to claim 1, said plurality of high-frequency pickup means each comprising electrostatic capacitance type pickups.

* * * * *